United States Patent
Kim et al.

(10) Patent No.: US 10,283,087 B2
(45) Date of Patent: May 7, 2019

(54) DIGITAL SIGNAGE DEVICE AND METHOD FOR OPERATING THE SAME

(71) Applicant: SK Planet Co., Ltd., Gyeonggi-do (KR)

(72) Inventors: Young Hoon Kim, Gyeonggi-do (KR); Hyun Wook Kim, Gyeonggi-do (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 99 days.

(21) Appl. No.: 15/392,631

(22) Filed: Dec. 28, 2016

(65) Prior Publication Data

US 2017/0365235 A1 Dec. 21, 2017

(30) Foreign Application Priority Data

Jun. 15, 2016 (KR) .................. 10-2016-0074550
Jun. 15, 2016 (KR) .................. 10-2016-0074563

(51) Int. Cl.

| G09G 5/12 | (2006.01) |
|---|---|
| G06F 17/21 | (2006.01) |
| G06F 17/22 | (2006.01) |
| G06F 17/24 | (2006.01) |
| G06F 3/147 | (2006.01) |

(52) U.S. Cl.
CPC ............. *G09G 5/12* (2013.01); *G06F 3/147* (2013.01); *G06F 17/218* (2013.01); *G06F 17/2229* (2013.01); *G06F 17/2235* (2013.01); *G06F 17/241* (2013.01); *G09G 2370/18* (2013.01); *G09G 2380/06* (2013.01)

(58) Field of Classification Search
CPC ........................... G09G 5/12; G09G 2380/06
USPC ..................... 345/1.1–2.3, 55–111
See application file for complete search history.

(56) References Cited

U.S. PATENT DOCUMENTS

| 8,593,255 B2 * | 11/2013 | Pang .................. G06K 7/10019 |
| | | 340/10.1 |
| 8,897,707 B2 * | 11/2014 | Faith .................. G06Q 30/0201 |
| | | 345/156 |
| 2009/0289936 A1 * | 11/2009 | Sheedy ............... G06Q 20/327 |
| | | 345/214 |
| 2011/0060640 A1 * | 3/2011 | Thompson ............ G06Q 20/32 |
| | | 705/14.36 |
| 2011/0185607 A1 * | 8/2011 | Forster .................... G09F 13/04 |
| | | 40/452 |
| 2011/0307309 A1 * | 12/2011 | Forster ................... G06Q 30/02 |
| | | 705/14.4 |
| 2012/0062442 A1 * | 3/2012 | Locker .................. G06F 3/1446 |
| | | 345/1.3 |
| 2012/0062475 A1 * | 3/2012 | Locker .................... G06F 3/041 |
| | | 345/173 |
| 2014/0327630 A1 * | 11/2014 | Burr ...................... G06F 3/0488 |
| | | 345/173 |
| 2015/0134375 A1 * | 5/2015 | Ogawa ................... G06Q 10/02 |
| | | 705/5 |
| 2015/0227164 A1 * | 8/2015 | Laycock ................ G06F 1/163 |
| | | 345/82 |

(Continued)

*Primary Examiner* — Michael Pervan
(74) *Attorney, Agent, or Firm* — Fenwick & West LLP

(57) ABSTRACT

Disclosed is a digital signage device and a method for operating the same, the digital signage device enabling a terminal, which has approached a display panel, to acquire tagging information, which has been updated with regard to each display object inside contents displayed on the display panel.

19 Claims, 12 Drawing Sheets

(56) References Cited

U.S. PATENT DOCUMENTS

2015/0227338 A1* 8/2015 Hoshikawa ........... G06F 1/1698
345/2.1

* cited by examiner

[Digital signage device]

First method for adding NFC tag layer:
mount between PCAP film and liquid crystal Second method for adding NFC tag layer:
mount together with ferrite sheet before metal back plate

[Digital signage device]

DIGITAL SIGNAGE DEVICE AND METHOD FOR OPERATING THE SAME

CROSS-REFERENCE TO RELATED APPLICATIONS

The instant application is based on and claims priority to Korean Patent Application No. 10-2016-0074550, filed on Jun. 15, 2016, Korean Patent Application No. 10-2016-0074563, filed on Jun. 15, 2016. The disclosures of above-listed applications are hereby incorporated by reference herein in their entirety.

TECHNICAL FIELD

The present disclosure relates to a digital signage device and a method for operating the same, the digital signage device enabling a terminal, which has approached a display panel, to acquire tagging information, which has been updated with regard to each display object inside contents displayed on the display panel.

In addition, the present disclosure relates to a digital signage device and a method for operating the same, the digital signage device selecting and displaying targeting contents with regard to a user, who has approached a display panel, and enabling to the user to acquire tagging information, which has been updated with regard to each display object inside the targeting contents, through a terminal.

BACKGROUND ART

In line with the rapid development of technologies occurring recently, not only existing newspaper and television media, but also various types of new media, such as a digital signage device, have appeared.

Digital signage devices have been installed and operated in large buildings having a large floating population, such as a terminal, a government office, a bus stop, a department store, a subway, an airport, a hotel, and a hospital, as well as in places where people stay for a period of time, such as a business venue, an elevator, a theater, a restaurant, a shopping mall, and a store; and there has been an ever-increasing demand for the digital signage devices.

The early type of a digital signage device simply employs a display panel, such as a PDP (Plasma Display Panel), an LCD (Liquid Crystal Display), or a LED (Light Emitting Diode), as the signboard or billboard, thereby displaying contents through the display panel.

In contrast, recent digital signage devices have developed in such a direction that, by causing a terminal approaching a digital signage device to acquire various kinds of information related to the displayed contents using near field communication (hereinafter, referred to as NFC) technology.

Meanwhile, tagging technology employed by a digital signage device has normally been operated in such a manner that a tag is placed in a separate space, besides the display panel on which contents are displayed by the digital signage device, and the terminal tags the same and acquires information related to the contents.

Therefore, there is a limit on intuitively delivering information related to each of various display objects, which may be included in the contents, through the tag provided in the separate space besides the display panel; and the range of information that can be delivered to the terminal is unavoidably limited to the range of information that is stored in the tag; as a result, it is not easy to provided new or various kinds of information related to the contents.

Furthermore, according to the existing scheme for displaying contents by a digital signage device, the same contents are repeatedly displayed in most cases; such repeated display of the same contents also involves a limitation in that the degree of interest of users in the corresponding contents may drop substantially.

SUMMARY

The present disclosure has been made in view of the above-mentioned situation, and an aspect of the present disclosure is to mount multiple tag blocks inside a display panel and to activate a tag block, which is related to each display object inside the contents displayed on the display panel, among the mounted tag blocks such that tagging information within the activated tag block can be updated using tagging information received from a server, thereby enabling a terminal, which has approached the display panel, to acquire updated tagging information related to each display object inside the contents.

Another aspect of the present disclosure is to select and display targeting contents with regard to a user, who has approached a display panel, and to activate a tag block related to each display object inside the targeting contents, among multiple tag blocks mounted inside the display panel such that tagging information within the activated tag block can be updated using tagging information received from a server, thereby enabling a terminal, which has approached the display panel, to acquire updated tagging information related to each display object inside the targeting contents.

In accordance with an embodiment of the present disclosure, there is provided a digital signage device including: a processor configured to perform calculation related to tag information; and a memory in which at least one command executed by the processor is stored, wherein the at least one command includes: an activation command configured such that, on the basis of contents displayed on a display panel, at least portion of tag block among multiple tag blocks, which are mounted in positions related to the display panel, are activated; and an update command configured such that, when tag information related to the contents needs to be updated with regard to each of the at least portion of tag block, tag information regarding each of the at least portion of tag block is updated using tag information received from a server, thereby enabling a terminal, which has approached the display panel, to acquire updated tag information from each of the at least portion of tag block.

In accordance with an embodiment of the present disclosure, there is provided a digital signage device operating method including: activating, on the basis of contents displayed on a display panel, at least portion of tag block among multiple tag blocks, which are mounted in positions related to the display panel; and updating, when tag information related to the contents needs to be updated with regard to each of the at least portion of tag block, tag information regarding each of the at least portion of tag block using tag information received from a server, thereby enabling a terminal, which has approached the display panel, to acquire updated tag information from each of the at least portion of tag block.

In accordance with an embodiment of the present disclosure, there is provided a digital signage device including: a processor configured to perform calculation related to tag information; and a memory in which at least one command executed by the processor is stored, wherein the at least one command includes: an acquisition command configured such that, when a user exists, and when the distance between the user and a display panel is within a threshold value, contents selection information related to the user is acquired, and targeting contents regarding the user are selected on the basis of the contents selection information; an activation command configured such that, on the basis of the targeting contents, at least portion of tag block among multiple tag blocks, which are mounted in positions related to the display panel, are activated; and an update command configured such that, when tag information related to the targeting contents needs to be updated with regard to each of the at least portion of tag block, tag information regarding each of the at least portion of tag block is updated using tag information received from a server, thereby enabling a terminal, which has approached the display panel, to acquire updated tag information from each of the at least portion of tag block.

The digital signage device and the method for operating the same, according to the present disclosure, are advantageous in that multiple tag blocks are mounted inside a display panel; a tag block related to each display object inside contents, which are displayed on the display panel, among the mounted tag blocks is activated such that tagging information within the activated tag block can be updated using tagging information received from the server; accordingly, updated tagging information related to each display object inside the contents can be acquired intuitively; and new or various kinds of information related to each display object inside the contents can be acquired through the updated tagging information.

Furthermore, according to the digital signage device and the method for operating the same, according to the present disclosure, targeting contents are selected and displayed with regard to a user, who has approached a display panel, thereby increasing the degree of interest of the user in the contents displayed on the digital signage device. In addition, a tag block related to each display object inside targeting contents, among multiple tag blocks mounted on the display panel, is activated; tagging information inside the activated tag block is updated using tagging information received from the server; accordingly, a terminal, which has approached the display panel, can intuitively acquire updated tagging information related to each display object inside the targeting contents; and new or various kinds of information related to each display object inside the targeting contents can be provided through the corresponding tagging information.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
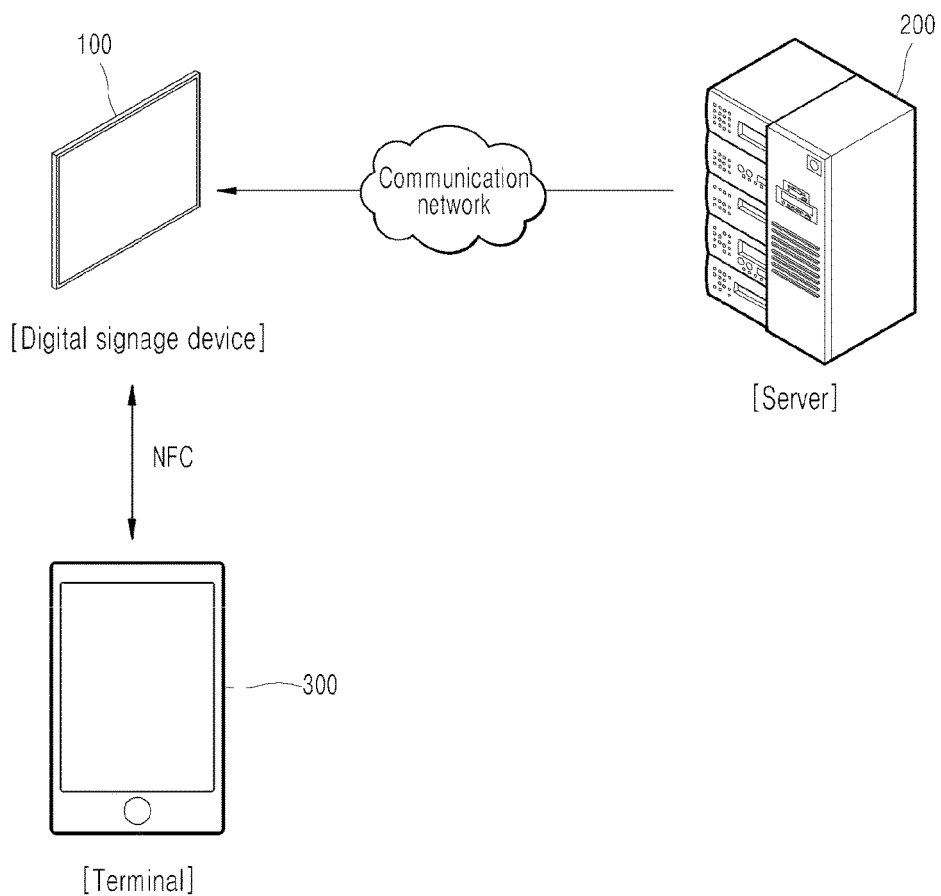
FIG. 1 is a diagram illustrating a schematic configuration of a contents providing system according to a first embodiment of the present disclosure.

It should be noted that the technical terms as used herein are merely used for describing particular embodiments, and are not intended to limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, although terms including ordinal numbers such as first, second, and the like may be used to describe various elements, the elements should not be restricted by the terms. The terms are used merely for the purpose to distinguish an element from the other elements. For example, a first element may be termed a second element, and similarly, a second element may be termed a first element without departing from the scope of the present disclosure.

Hereinafter, embodiments of the present disclosure will be described in detail with reference to the accompanying drawings, equal or similar elements are assigned an equal reference numeral, and an overlapping description thereof will be omitted.

Further, in the following description of the technology of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the technical idea should not be construed as being limited by the accompanying drawings.

Hereinafter, the first embodiment of the present disclosure will be described with reference to the accompanying drawings.

FIG. 1 is a diagram illustrating a contents providing system according to the first embodiment of the present disclosure.

As illustrated in FIG. 1, the contents providing system according to the first embodiment of the present disclosure may be configured to include a digital signage device 100 configured to display contents on a display panel (screen), a server 200 configured to provide updated tagging information to the digital signage device 100, and a terminal 300 configured to acquire tagging information from the digital signage device 100.

The digital signage device 100 is a combination of various IT technologies, including hardware, software, contents, and networks, and refers to a digital information display (hereinafter, referred to as a DID) capable of displaying various types of information, such as still images and moving images, and various contents, such as advertisement data.

In general, the early type of the digital signage device 100 simply employs a display panel, which is made of a PDP (Plasma Display Panel), an LCD (Liquid Crystal Display), or a LED (Light Emitting Diode), as the signboard or billboard, thereby displaying contents through the display panel.

In contrast, according to the first embodiment of the present disclosure, a tagging technology based on near field communication (hereinafter, referred to as NFC) is employed to enable a terminal 300, which has approached, to acquire tagging information related to contents currently displayed on the display panel.

In this regard, the contents displayed on the display panel may include multiple display objects, and such display objects may be independently displayed with regard to different topics or with regard to common topics in respective split areas, which are obtained by splitting the screen of the display panel in a square lattice pattern, or may be displayed in an arbitrary display position on the display panel with no separate split areas.

The contents, which are displayed on the display panel in this manner, may have been stored in the digital signage device 100 in advance, for example, or may be received from the digital signage device 100 through a communication network from the server 200 or from a separate contents server (not illustrated).

For reference, the NFC technology employed by the digital signage device 100 is a very short-range contactless data transfer technology related to RFID (radio frequency identification), and may be used for communication between devices positioned within a distance of 10 cm, for example.

The NFC provides a center frequency of 13.56 MHz, and may provide a transmission rate of 106, 212, and 424 kbps. The NFC may have compatibility with various contactless communication protocols.

For example, the NFC may have compatibility with protocols defined under ISO 14443 types A, B, F and ISO 18092.

An electronic device, which employs the NFC technology, may communicate with another electronic device, which employs the NFC technology, through at least one of a reader mode, a card emulation mode, and a peer-to-peer mode, for example.

The server 200 refers to a device configured to provide the digital signage device 100 with tagging information, which is to be updated by the digital signage device 100.

To this end, the server 200 has information regarding each display object inside the contents displayed by the digital signage device 100 (for example, detailed information, purchase information, and connection URL), and, when information related to each display object is updated, the updated information can be provided to the digital signage device 100.

The terminal 300 refers to a mobile device configured to acquire tagging information related to each display object inside the contents from the digital signage device 100.

The terminal 300 may be, for example, a smartphone, a tablet PC, or a PDA, but is not limited thereto, and may include every device that supports the NFC-based tagging technology.

On the other hand, it has been mentioned that, in connection with the digital signage device 100 according to the first embodiment of the present disclosure, the NFC-based tagging technology may be employed to enable the terminal, which has approached, to acquire information related to contents displayed on the display panel.

Tagging technology employed by the digital signage device 100 is normally operated such that a tag is placed in a separate space, besides the display panel on which contents are displayed, and the terminal 300 tags the same and acquires information.

However, such a scheme of placing a tag in a separate space, besides the display panel on which contents are displayed by the digital signage device 100, such that the terminal 300 tags the same, has a limit on intuitively delivering information related to each of various display objects that can be included in the contents.

Furthermore, it is usually impossible to update the information stored in the tag in real time, limiting the range of information that can be delivered to the terminal 300 to the range of information stored in the tag; therefore, it is not easy to provide various kinds of information related to the contents.

In this regard, the first embodiment of the present disclosure seeks to provide such a scheme that a terminal 300, which has approached a display panel of a digital signage device 100, can acquire tagging information updated with regard to each display object inside contents displayed on the display panel; hereinafter, the detailed configuration of a digital signage device 100 for implementing the same will be described.

Figure 2:
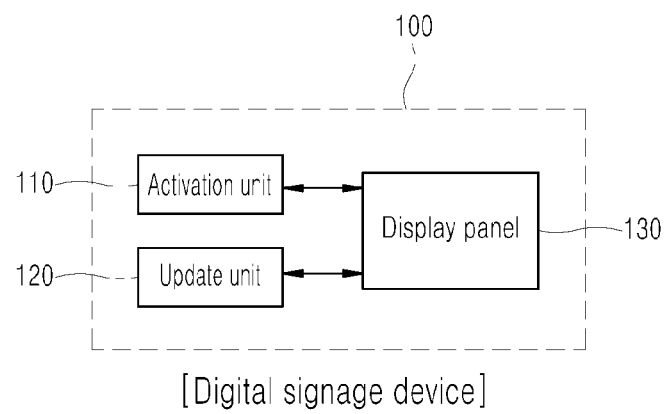
FIG. 2 is a diagram illustrating a schematic configuration of a digital signage device according to the first embodiment of the present disclosure.

In this connection, FIG. 2 illustrates a schematic configuration of a digital signage device 100 according to the first embodiment of the present disclosure.

As illustrated in FIG. 2, the digital signage device 100 according to the first embodiment to the present disclosure may be configured to include an activation unit 110 configured to activate a tag block, which is related to contents, among multiple tag blocks mounted inside the display panel 130 and an update unit 120 configured to update tagging information within the activated tag block.

The entire configuration of the digital signage device 100, which includes the above-mentioned activation unit 110, the update unit 120, and the display panel 130, or at least a part of the configuration, may be implemented as a software module, which is executed by a processor, or a hardware module, and may also be implemented as a combination of a software module and a hardware module.

On the other hand, the first embodiment of the present disclosure has such a structure to that multiple tag blocks are directly mounted on the display panel 130, in order to deliver information related to a display object inside contents, which are currently displayed on the display panel 130, to the terminal 300 more intuitively.

Figure 3:
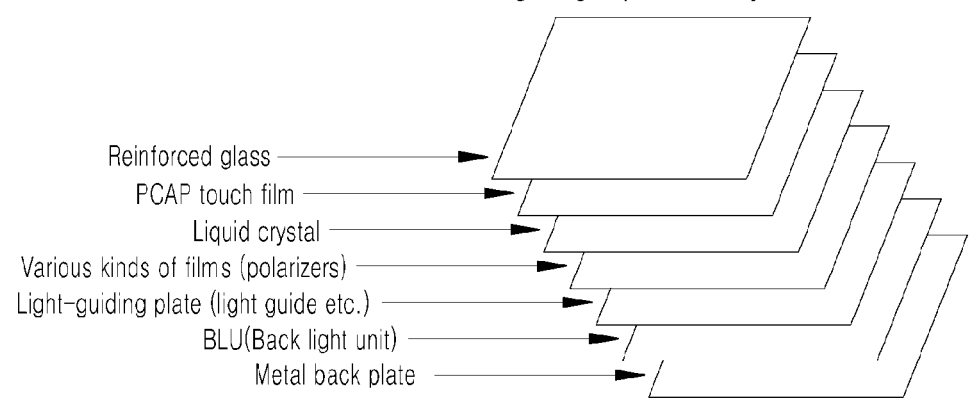
FIG. 3 is a diagram illustrating an exemplary configuration of a conventional display panel.

In this regard, FIG. 3 illustrates a schematic exploded perspective view of a conventional display panel.

As illustrated in FIG. 3, the conventional display panel may be configured as multiple layers including, for example, reinforced glass, PCAP touch film, liquid crystal, various films (polarizers), a light-guiding plate, a BLU, and a metal back plate.

The display panel 130 according to the first embodiment of the present disclosure has the same configuration as that of the conventional display panel described with reference to FIG. 3, and is also configured such that a tag layer, which has multiple tag blocks mounted thereon, is additionally inserted on the existing multiple layers.

Figure 4:
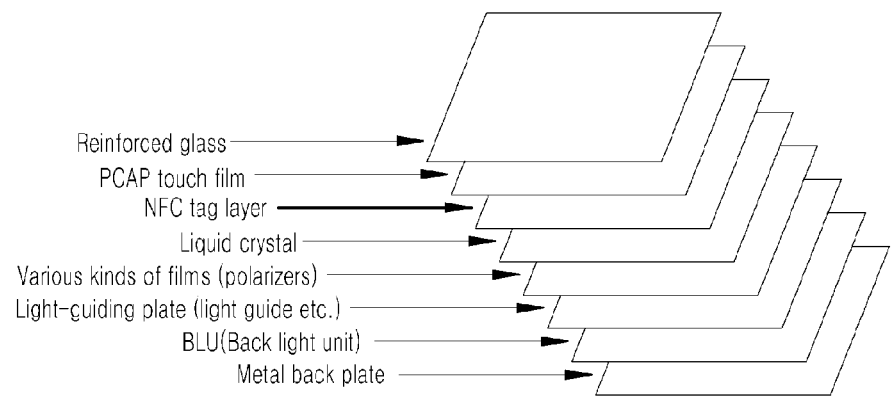
FIG. 4 is a diagram illustrating an exemplary configuration of a display panel according to the first embodiment of the present disclosure.
Figure 4:
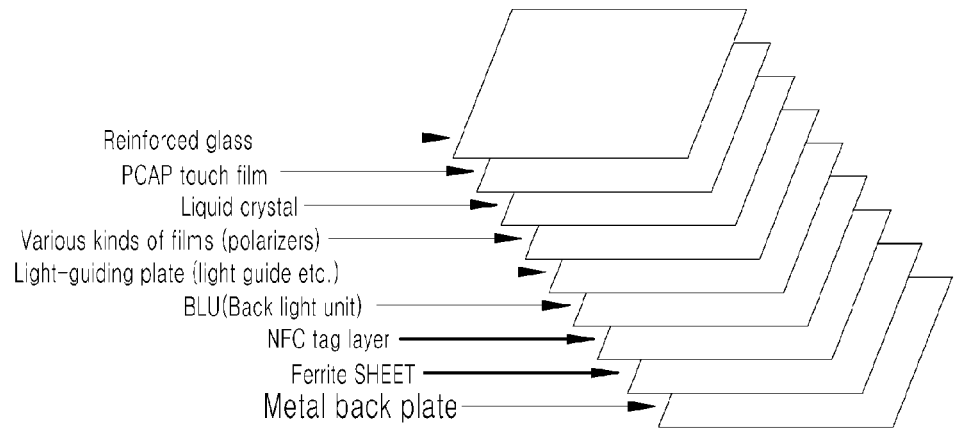

FIG. 4 illustrates a schematic exploded perspective view of the display panel 130 according to the first embodiment of the present disclosure.

It can be confirmed from FIG. 4 that the display panel 130 according to the first embodiment of the present disclosure has, besides multiple layers that constitute the conventional display panel, such as reinforced glass, PCAP touch film, liquid crystal, various films (polarizers), a light-guiding plate, a BLU, and a metal back plate, an NFC tag layer, which has multiple tag blocks mounted thereon, additionally inserted therein.

The tag layer may be inserted, for example, into an upper layer adjacent to a layer among the multiple layers, on which contents are substantially displayed (i.e. liquid crystal layer), as a larger tagging-enabling distance is requested, the tagging-enabling distance being a distance at which a terminal 300 that has approached the display panel 130 can acquire tag information; and, if the tagging-enabling distance is required to be equal to or larger than a threshold value, a ferrite sheet may be inserted together on the bottom surface.

In this case, the tag layer is inserted into the multiple layers, which constitute the conventional display panel, and can be configured to overlap with the multiple existing layers.

In this connection, the number of tag blocks mounted on the tag layer may be determined in view of the number of display objects that can be included in the contents; assuming that the display objects are displayed in respective split areas obtained by splitting the screen of the display panel in a square lattice pattern, the number of tag blocks may be equal to that of the split areas; and the number of tag blocks may be larger than that of the split areas on to the basis of each square lattice pattern that has a smaller size than that of the square lattice pattern on the screen of the display panel.

For reference, the ferrite sheet plays the role of a kind of reflecting plate, and can reflect an NFC signal, which is generated to the bottom surface of the tag layer, such that the same is directed towards the upper surface of the display panel 130, i.e. the direction in which contents are displayed.

As such, the display panel 130 according to the first embodiment of the present disclosure adopts such a structure that multiple layers, which constitute a conventional display panel, and a tag layer, on which multiple tag blocks are mounted, can be overlapped, making it unnecessary to provide a separate space for inserting a tag, besides the display panel 130 for displaying contents by the digital signage device 130; and contents, which are displayed on the display panel 130, and the tag block on the bottom surface are overlapped such that the terminal 300 can directly tag the contents, making it possible to deliver intuitive information related to the contents.

In summary, the digital signage device 100 according to the first embodiment of the present disclosure enables the terminal 300, which has approached the display panel 130, to acquire tagging information, which has been updated with regard to each display object inside the contents displayed on the display panel 130, using the above features; hereinafter, each feature inside the digital signage device 100 to this end will be described in more detail.

The activation unit 110 plays the role of activating a tag block mounted on the display panel 130.

More particularly, the activation unit 110 activates at least portion of tag block among the tag blocks, which are mounted inside the display panel 130, on the basis of the display position of each display object within the contents displayed on the display panel 130.

In this case, the activation unit 110 confirms the display position on the display panel 130 with regard to each display object, and activates only at least portion of tag block, which are mounted in positions that overlap with the display position on the display panel 130, among the multiple tag blocks.

It would be obvious that the remaining tag blocks, which are confirmed as not overlapping with the display position on the display panel 130, switch to a non-activated state or maintain the existing non-activated state.

Figure 5:
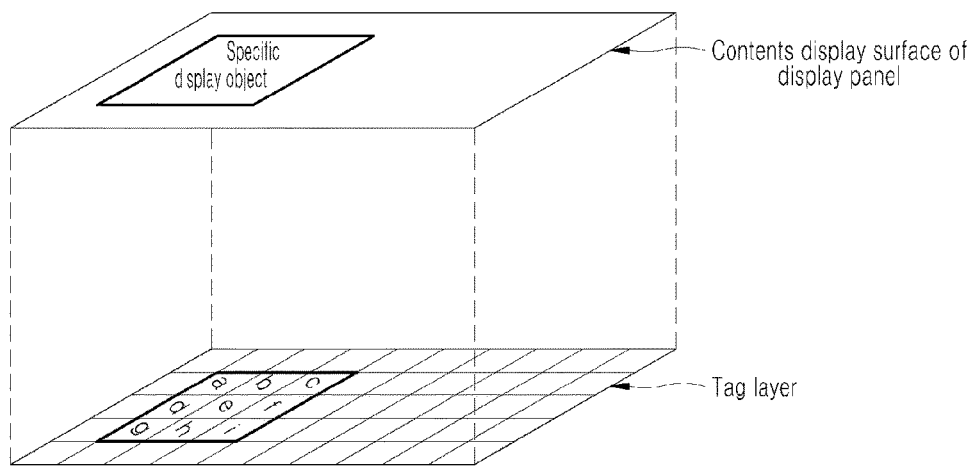
FIG. 5 and FIG. 6 are diagrams illustrating exemplary tag block activation schemes according to the first embodiment of the present disclosure, respectively.

On the other hand, it could be assumed, as illustrated in FIG. 5, that two or more tag blocks (a,b,c,d,e,f,g,h,i) are mounted in positions that overlap with the display position of a specific display object.

In this case, the activation unit 110 activates at least some of the two or more tag blocks (a,b,c,d,e,f,g,h,i) on the basis of the degree of importance of the specific display object inside the contents.

When the degree of importance of the specific display object within the contents is equal to or larger than a threshold value, the activation unit 110 may activate all of the two or more tag blocks (a,b,c,d,e,f,g,h,i), which are mounted in positions that overlap with the display position of the specific display object.

It could be understood, in this regard, that, if the degree of importance of a specific display object is equal to or larger than the threshold value, it is highly necessary that information related to the specific display object be delivered to the terminal 300 that has approached the display panel 130; accordingly, all of the two or more tag blocks (a,b,c,d,e,f, g,h,i) mounted in positions that overlap with the display position of the specific display object are activated, thereby increasing the probability that tagging information related to the specific display object will be delivered to the terminal 300.

On the other hand, when the degree of importance of the specific display object within the contents is less than the threshold value, the activation unit 110 may activate only some tag blocks (e) among the two or more tag blocks (a,b,c,d,e,f,g,h,i), which are mounted in positions that overlap with the display position of the specific display object.

It could be understood, in this regard, that, if the degree of importance of a specific display object is less than the threshold value, it is of an average or low necessity that information related to the specific display object be delivered to the terminal 300 that has approached the display panel 130; accordingly, only some tag blocks (e) among the two or more tag blocks (a,b,c,d,e,f,g,h,i), which are mounted in positions that overlap with the display position of the specific display object, are activated, thereby maintaining or lowering the probability that tagging information related to the specific display object will be delivered to the terminal 300.

Figure 6:
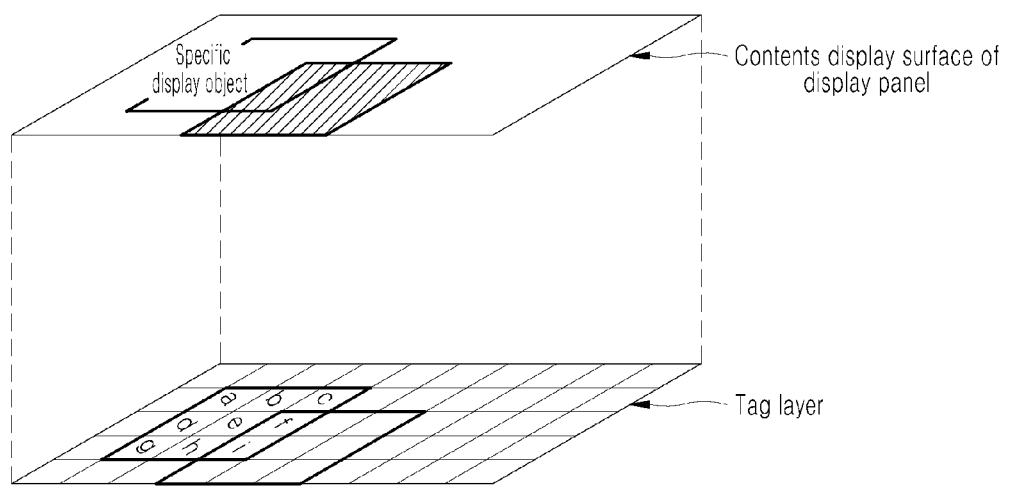

It could also be assumed, as illustrated in FIG. 6, that two or more tag blocks (a,b,c,d,e,f,g,h,i) are mounted in positions that overlap with the display position of a specific display object, and some tag blocks (f,i) among the two or more tag blocks (a,b,c,d,e,f,g,h,i) are mounted in positions that overlap with the display position of another display object.

In this case, the activation unit 110 activates only the remaining tag blocks (a,b,c,d,e,g,h), other than the at least portion of tag block (f,i), among the two or more tag blocks (a,b,c,d,e,f,g,h,i).

Such activation of only the remaining tag blocks (a,b,c,d,e,g,h), other than some tag blocks (f,i), when two or more tag blocks (a,b,c,d,e,f,g,h,i) are mounted in positions that overlap with the display position of a specific display object, and when some tag blocks (f,i) among the two or more tag blocks (a,b,c,d,e,f,g,h,i) are mounted in positions that overlap with the display position of another display object, is for the purpose of preventing delivery of erroneous tagging information to the terminal 300 as a result of a tagging operation in the boundary area.

The update unit 120 performs the function of updating tagging information regarding an activated tag block.

More specifically, assuming that a tag block, which is mounted in a position that overlaps with the display position of each display object inside contents, has completely been activated, and information related to each display object needs to be updated, the update unit 120 updates tagging information regarding the activated tag block using tagging information received from the server 200 such that the terminal 300, which has approached the display panel, can acquire the updated tag information from each activated tag block.

In this case, the updated tagging information regarding the activated tag block may be received in real time from the server 200 or may be received from the server 200 at the request of the update unit 120; and it could be considered, if updated tagging information is received from the server 200, that information related to each display object needs to be updated.

On the other hand, assuming that, according to the first embodiment of the present disclosure, update of tagging information regarding an activated tag block is unnecessary because interworking with the server 200 proceeds only when the tagging information is updated, a tag mode is always maintained such that tagging information can be delivered to the terminal 300 that has approached.

In other words, in a normal case, a tag block acquires identification information (ID) of a terminal 300, which approaches, through the reader mode and receives tagging information, which confirms to the ID, from the server 200; and the terminal 300 can acquire tagging information when switching to the tag mode occurs.

In contrast, a tag block according to the first embodiment of the present disclosure conducts interworking with the server 200 only when tagging information is updated, thereby limiting frequent interworking with the server 200; and, since the tag mode is always maintained, switching between the tag mode and the reader mode becomes unnecessary.

Each feature inside the digital signage device 100, described above, may be implemented as a software module, which is executed by a processor, or as a hardware module, or may be implemented as a combination of a software module and a hardware module, as described above.

Such a software module executed by a processor, a hardware module, or a combination of a software module and a hardware module may be implemented as a hardware system (for example, computer system).

Therefore, a hardware system 1000 for implementing the digital signage device 100 according to the first embodiment of the present disclosure will now be described with reference to FIG. 7.

It is to be noted, for reference, that an example for implementing each feature inside the digital signage device 100, described above, inside the hardware system 1000 will be described now, and each feature and the corresponding operation may different from those of the actual system.

Figure 7:
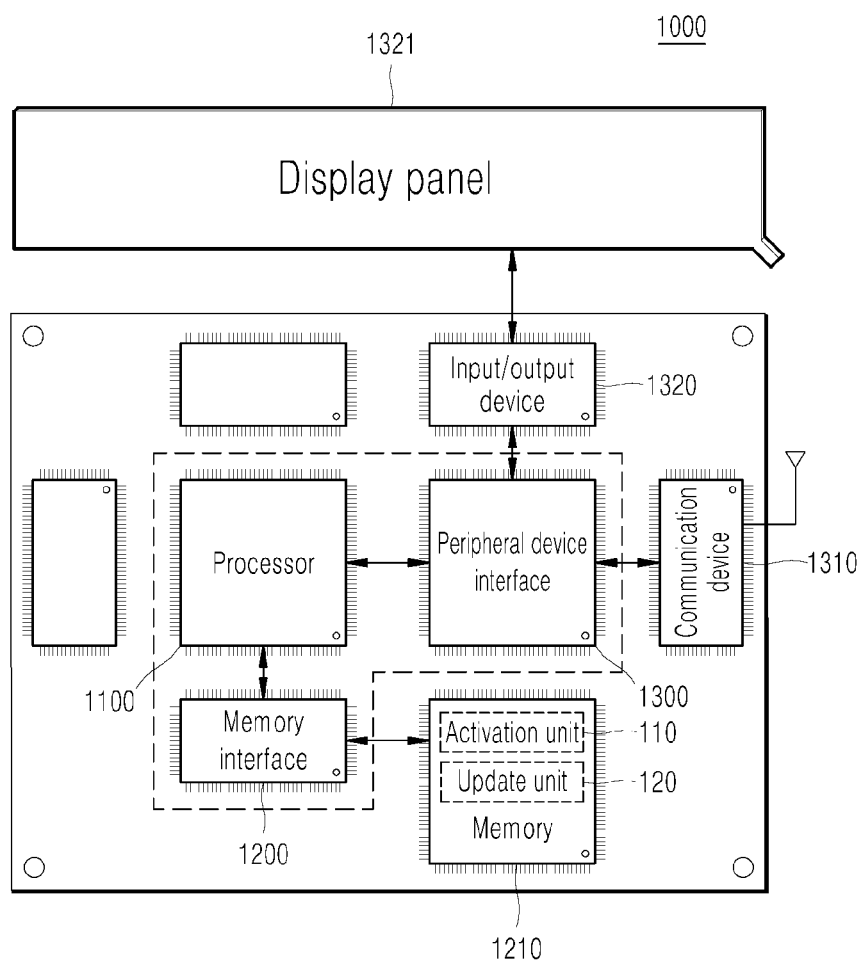
FIG. 7 is a diagram illustrating a schematic configuration of a hardware system for implementing a digital signage device according to the first embodiment of the present disclosure.

FIG. 7 is a diagram illustrating the structure of a hardware system 1000 for implementing the digital signage device 100 according to the first embodiment of the present disclosure.

As illustrated in FIG. 7, the hardware system 1000 according to the first embodiment of the present disclosure may be configured to include a processor 1100, a memory interface 1200, and a peripheral device interface 1300.

Each feature inside the hardware system 1000, described above, may be an individual component or may be integrated with at least one integrated circuit, and respective features may be coupled to a bus system (not illustrated).

In this regard, the bus system corresponds to an abstraction that represents one or more arbitrary individual physical buses, which are connected by proper bridges, adapters, and/or controllers, communication lines/interfaces, and/or multi-drop or point-to-point connections.

The processor 1100 plays the role of communicating with a memory 1210 through a memory interface 1200, in order to perform various functions in the hardware system, thereby executing various software modules stored in the memory 1210.

In this case, respective features inside the digital signage device 100, i.e. the activation unit 110 and the update unit 120, which have been described with reference to FIG. 2, can be stored as software modules, and other operating systems may also be stored additionally.

The operating system (for example, an embedded operating system such as I-OS, Android, Darwin, RTXC, LINUX, UNIX, OS X, WINDOWS, or VxWorks) includes various procedures, command sets, software components and/or drivers, which are used to control and manage normal system operations (for example, memory management, storage device control, and power management) and play the role of facilitating communication between various hardware modules and software modules.

For reference, the memory 1210 includes a cache, a main memory, and a secondary memory, but may also include a memory hierarchy that is not limited thereto, and the memory hierarchy may be implemented through any combination of a RAM (for example, an SRM, a DRAM, a DDDRM), a ROM, a flash memory, a magnetic and/or optical storage device (for example, a disk drive, a magnetic tape, a CD (compact disc), and a DVD (digital video disc)).

The peripheral device interface 1300 plays the role of enabling communication between the processor 1100 and peripheral devices.

The peripheral devices are for the purpose of providing the computer system with different functions, and may include a communication device 1310 and an input/output device 1320, for example, in the first embodiment of the present disclosure.

The communication device 1310 plays the role of providing a function of communication with another device and, to this end, includes an antenna system, an RF transceiver, at least one amplifier, a tuner, at least one oscillator, a digital signal processor, a codec chipset, and a memory, for example, but is not limited thereto, and may also include a widely known circuit that performs the above functions.

Communication protocols supported by the communication device 1310 may include, for example, protocols for LTE (long term evolution), TDMA (time division multiple access), CDMA (code division multiple access), GSM (global system for mobile communications), EDGE (enhanced data GSM environment), W-CDMA (wideband code division multiple access), Wi-Fi (IEEE 802.11a, IEEE 802.11b, IEEE 802.11g and/or IEEE 802.11n etc.), Bluetooth, Wi-MAX, VoIP (voice over Internet Protocol), email, instant messaging, and SMS (short message service), but are not limited thereto, and may include any protocols that provide environments for communication with another device.

The input/output device 1320 plays the role of a controller for controlling I/O devices that interwork with other hardware systems and, in the first embodiment of the present disclosure, is in charge of control of the display panel 1321.

In this case, as illustrated in FIG. 4, the display panel 1321 according to the first embodiment of the present disclosure has, besides multiple layers that constitute the conventional display panel, such as reinforced glass, PCAP touch film, liquid crystal, various films (polarizers), a light-guiding plate, a BLU, and a metal back plate, an NFC tag layer, which has multiple tag blocks mounted thereon, additionally inserted therein.

The tag layer may be inserted, for example, into an upper layer adjacent to a layer among the multiple layers, on which contents are substantially displayed (i.e. liquid crystal layer), as a larger tagging-enabling distance is requested, the tagging-enabling distance being a distance at which a terminal 300 that has approached the display panel 1321 can acquire tag information; and, if the tagging-enabling distance is required to be equal to or larger than a threshold value, a ferrite sheet may be inserted together on the bottom surface.

In this case, the tag layer is inserted into the multiple layers, which constitute the conventional display panel, and can be configured to overlap with the multiple existing layers.

In this connection, the number of tag blocks mounted on the tag layer may be determined in view of the number of display objects that can be included in the contents; assuming that the display objects are displayed in respective split areas obtained by splitting the screen of the display panel in a square lattice pattern, the number of tag blocks may be equal to that of the split areas; and the number of tag blocks may be larger than that of the split areas on the basis of each square lattice pattern that has a smaller size than that of the square lattice pattern on the screen of the display panel.

For reference, the ferrite sheet plays the role of a kind of reflecting plate, and can reflect an NFC signal, which is generated to the bottom surface of the tag layer, such that the same is directed towards the upper surface of the display panel 1321, i.e. the direction in which contents are displayed.

In addition, control of multiple tag blocks mounted on the tag layer may be conducted through a port, such as 12C/UART/SPI.

In summary, each feature inside the digital signage device 100, which is stored as a software module in the memory 1210, conducts communication with the communication device 1310 and the input/output device 1320 via the memory interface 1100 and the peripheral device interface 1300, when executed by a processor 1100, such that a terminal 300, which has approached the display panel 1321, can acquire tagging information that has been updated with regard to each display object inside the contents displayed on the display panel 1321.

Hereinafter, each feature inside the hardware system 1000 for implementing the digital signage device 100 will be described in more detail.

It will be assumed for convenience of description that the activation unit 110 and the update unit 120, which are respective features inside the digital signage device 100 stored as software modules in the memory 1210, have been executed by a processor 1100.

The activation unit 110 plays the role of activating a tag block mounted on the display panel 1321.

More particularly, the activation unit 110 activates at least portion of tag block among the tag blocks, which are mounted inside the display panel 1321, on the basis of the display position of each display object within the contents displayed on the display panel 1321.

In this case, the activation unit 110 confirms the display position on the display panel 1321 with regard to each display object through the input/output device 1320, activates only at least portion of tag block, which are mounted in positions that overlap with the display position on the display panel 1321, among the multiple tag blocks, and delivers the result of activation to the update unit 120.

It would be obvious that the remaining tag blocks, which are confirmed as not overlapping with the display position on the display panel 1321, switch to a non-activated state or maintain the existing non-activated state.

On the other hand, it could be assumed, as illustrated in FIG. 5, that two or more tag blocks (a,b,c,d,e,f,g,h,i) are mounted in positions that overlap with the display position of a specific display object.

In this case, the activation unit 110 activates at least some of the two or more tag blocks (a,b,c,d,e,f,g,h,i) on the basis of the degree of importance of the specific display object inside the contents.

When the degree of importance of the specific display object within the contents is equal to or larger than a threshold value, the activation unit 110 may activate all of the two or more tag blocks (a,b,c,d,e,f,g,h,i), which are mounted in positions that overlap with the display position of the specific display object.

It could be understood, in this regard, that, if the degree of importance of a specific display object is equal to or larger than the threshold value, it is highly necessary that information related to the specific display object be delivered to the terminal 300 that has approached the display panel 1321; accordingly, all of the two or more tag blocks (a,b,c,d,e,f,g,h,i) mounted in positions that overlap with the display position of the specific display object are activated, thereby increasing the probability that tagging information related to the specific display object will be delivered to the terminal 300.

On the other hand, when the degree of importance of the specific display object within the contents is less than the threshold value, the activation unit 110 may activate only some tag blocks (e) among the two or more tag blocks (a,b,c,d,e,f,g,h,i), which are mounted in positions that overlap with the display position of the specific display object.

It could be understood, in this regard, that, if the degree of importance of a specific display object is less than the threshold value, it is of an average or low necessity that information related to the specific display object be delivered to the terminal 300 that has approached the display panel 1321; accordingly, only some tag blocks (e) among the two or more tag blocks (a,b,c,d,e,f,g,h,i), which are mounted in positions that overlap with the display position of the specific display object, are activated, thereby maintaining or lowering the probability that tagging information related to the specific display object will be delivered to the terminal 300.

It could also be assumed, as illustrated in FIG. 6, that two or more tag blocks (a,b,c,d,e,f,g,h,i) are mounted in positions that overlap with the display position of a specific display object, and some tag blocks (f,i) among the two or more tag blocks (a,b,c,d,e,f,g,h,i) are mounted in positions that overlap with the display position of another display object.

In this case, the activation unit 110 activates only the remaining tag blocks (a,b,c,d,e,g,h), other than the at least portion of tag block (f,i), among the two or more tag blocks (a,b,c,d,e,f,g,h,i).

Such activation of only the remaining tag blocks (a,b,c,d,e,g,h), other than some tag blocks (f,i), when two or more tag blocks (a,b,c,d,e,f,g,h,i) are mounted in positions that overlap with the display position of a specific display object, and when some tag blocks (f,i) among the two or more tag blocks (a,b,c,d,e,f,g,h,i) are mounted in positions that overlap with the display position of another display object, is for the purpose of preventing delivery of erroneous tagging information to the terminal 300 as a result of a tagging operation in the boundary area.

The update unit 120 performs the function of updating tagging information regarding an activated tag block.

More specifically, assuming that a result of activating a tag block is received from the activation unit 110, and information related to each display object needs to be updated, the update unit 120 updates tagging information regarding the activated tag block using tagging information received from the server 200 through the communication device 1310 such that the terminal 300, which has approached the display panel 1321, can acquire the updated tag information from each activated tag block.

In this case, the updated tagging information regarding the activated tag block can be received in real time from the server 200 through the communication device 1310, or can be received from the server 200 at the request of the update unit 120 through the communication device 1310.

On the other hand, assuming that, according to the first embodiment of the present disclosure, update of tagging information regarding an activated tag block is unnecessary because interworking with the server 200 proceeds only when the tagging information is updated, a tag mode is always maintained such that tagging information can be delivered to the terminal 300 that has approached.

In other words, in a normal case, a tag block acquires identification information (ID) of a terminal 300, which approaches, through the reader mode and receives tagging information, which confirms to the ID, from the server 200; and the terminal 300 can acquire tagging information when switching to the tag mode occurs.

In contrast, a tag block according to the first embodiment of the present disclosure conducts interworking with the server 200 only when tagging information is updated, thereby limiting frequent interworking with the server 200; and, since the tag mode is always maintained, switching between the tag mode and the reader mode becomes unnecessary.

As described above, the digital signage device 100 according to the first embodiment of the present disclosure and the hardware system 1000 for implementing the same are advantageous in that multiple tag blocks are mounted inside a display panel 130, 1321, and a tag block related to each display object inside contents, which are displayed on the display panel, among the mounted tag blocks is activated such that tagging information inside the activated tag block can be updated using tagging information received from the server 200; as a result, a terminal 300, which has approached the display panel 130, 1321 can intuitively acquire tagging information related to each display object inside the contents, and new or various types of information related to each display object inside the contents can be acquired through the updated tagging information.

Figure 8:
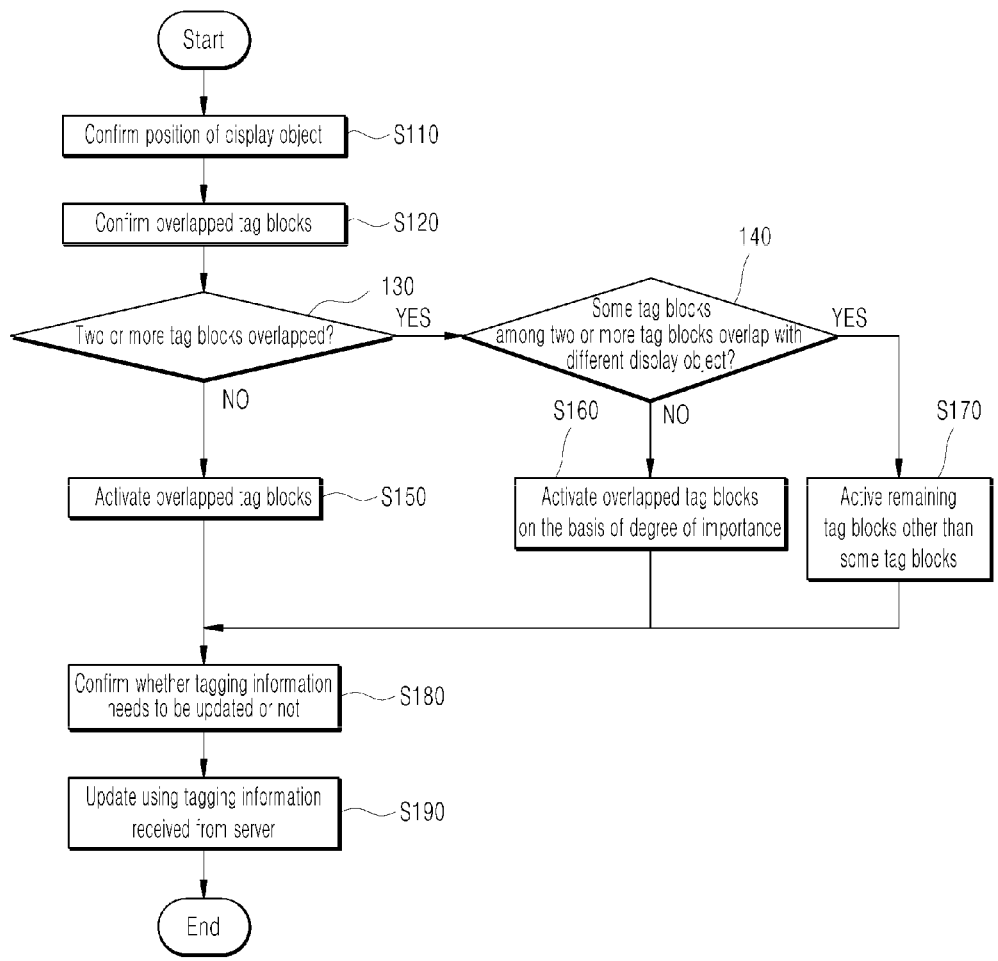
FIG. 8 is a flowchart illustrating the flow of operation in a digital signage device according to the first embodiment of the present disclosure.

Having described the digital signage device 100 according to the first embodiment of the present disclosure and the hardware system 1000 for implementing the digital signage device 100, the flow of operation in the digital signage device 100 according to the first embodiment of the present disclosure will now be described with reference to FIG. 8.

Firstly, the activation unit 110 activates at least portion of tag block among multiple tag blocks, which are mounted inside the display panel 130, on the basis of the display position of each display object within the contents displayed on the display panel 130, through steps S110 to S170.

In this case, the activation unit 110 confirms the display position on the display panel 130 with regard to each display object, and activates only at least portion of tag block, which are mounted in positions that overlap with the display position on the display panel 130, among the multiple tag blocks.

It would be obvious that the remaining tag blocks, which are confirmed as not overlapping with the display position on the display panel 130, switch to a non-activated state or maintain the existing non-activated state.

When it is confirmed in step S130 that two or more tag blocks (a,b,c,d,e,f,g,h,i) are mounted in positions that overlap with the display position of a specific display object as illustrated in FIG. 5, the activation unit 110 activates at least portion of tag block among the two or more tag blocks (a,b,c,d,e,f,g,h,i) on the basis of the degree of importance of the specific display object inside the contents, through step S160.

When the degree of importance of the specific display object within the contents is equal to or larger than a threshold value, the activation unit 110 may activate all of the two or more tag blocks (a,b,c,d,e,f,g,h,i), which are mounted in positions that overlap with the display position of the specific display object.

It could be understood, in this regard, that, if the degree of importance of a specific display object is equal to or larger than the threshold value, it is highly necessary that information related to the specific display object be delivered to the terminal 300 that has approached the display panel 130; accordingly, all of the two or more tag blocks (a,b,c,d,e,f,g,h,i) mounted in positions that overlap with the display position of the specific display object are activated, thereby increasing the probability that tagging information related to the specific display object will be delivered to the terminal 300.

On the other hand, when the degree of importance of the specific display object within the contents is less than the threshold value, the activation unit 110 may activate only some tag blocks (e) among the two or more tag blocks (a,b,c,d,e,f,g,h,i), which are mounted in positions that overlap with the display position of the specific display object.

It could be understood, in this regard, that, if the degree of importance of a specific display object is less than the threshold value, it is of an average or low necessity that information related to the specific display object be delivered to the terminal 300 that has approached the display panel 130; accordingly, only some tag blocks (e) among the two or more tag blocks (a,b,c,d,e,f,g,h,i), which are mounted in positions that overlap with the display position of the specific display object, are activated, thereby maintaining or lowering the probability that tagging information related to the specific display object will be delivered to the terminal 300.

In addition, when it is confirmed in steps S130 and S140 that two or more tag blocks (a,b,c,d,e,f,g,h,i) are mounted in positions that overlap with the display position of a specific display object, and some tag blocks (f,i) among the two or more tag blocks (a,b,c,d,e,f,g,h,i) are mounted in positions that overlap with the display position of another display object, as illustrated in FIG. 6, the activation unit 110 activates only the remaining tag blocks (a,b,c,d,e,g,h), other than the at least some blocks (f,i), among the two or more tag blocks (a,b,c,d,e,f,g,h,i), through step S170.

Such activation of only the remaining tag blocks (a,b,c,d,e,g,h), other than some tag blocks (f,i), when two or more tag blocks (a,b,c,d,e,f,g,h,i) are mounted in positions that overlap with the display position of a specific display object, and when some tag blocks (f,i) among the two or more tag blocks (a,b,c,d,e,f,g,h,i) are mounted in positions that overlap with the display position of another display object, is for the purpose of preventing delivery of erroneous tagging information to the terminal 300 as a result of a tagging operation in the boundary area.

Thereafter, when it is confirmed through steps S110 to S170 that a tag block, which is mounted in a position that overlaps with the display position of each display object inside contents, has completely been activated, and when it is confirmed through step S180 that information related to each display object needs to be updated, the update unit 120 updates tagging information regarding the activated tag block using tagging information received from the server 200, according to step S190, such that the terminal 300, which has approached the display panel, can acquire the updated tag information from each activated tag block.

In this case, the updated tagging information regarding the activated tag block may be received in real time from the server 200 or may be received from the server 200 at the request of the update unit 120; and it could be considered, if updated tagging information is received from the server 200, that information related to each display object needs to be updated.

On the other hand, assuming that, according to the first embodiment of the present disclosure, update of tagging information regarding an activated tag block is unnecessary because interworking with the server 200 proceeds only when the tagging information is updated, a tag mode is always maintained such that tagging information can be delivered to the terminal 300 that has approached.

In other words, in a normal case, a tag block acquires identification information (ID) of a terminal 300, which approaches, through the reader mode and receives tagging information, which confirms to the ID, from the server 200; and the terminal 300 can acquire tagging information when switching to the tag mode occurs.

In contrast, a tag block according to the first embodiment of the present disclosure conducts interworking with the server 200 only when tagging information is updated, thereby limiting frequent interworking with the server 200; and, since the tag mode is always maintained, switching between the tag mode and the reader mode becomes unnecessary.

As described above, the flow of operation in the digital signage device 100 according to the first embodiment of the present disclosure is advantageous in that multiple tag blocks are mounted inside a display panel 130, 1321, and a tag block related to each display object inside contents, which are displayed on the display panel, among the mounted tag blocks is activated such that tagging information inside the activated tag block can be updated using tagging information received from the server 200; as a result, a terminal 300, which has approached the display panel 130, 1321 can intuitively acquire tagging information related to each display object inside the contents, and new or various types of information related to each display object inside the contents can be acquired through the updated tagging information.

Hereinafter, the second embodiment of the present disclosure will be described with reference to the accompanying drawings.

Figure 9:
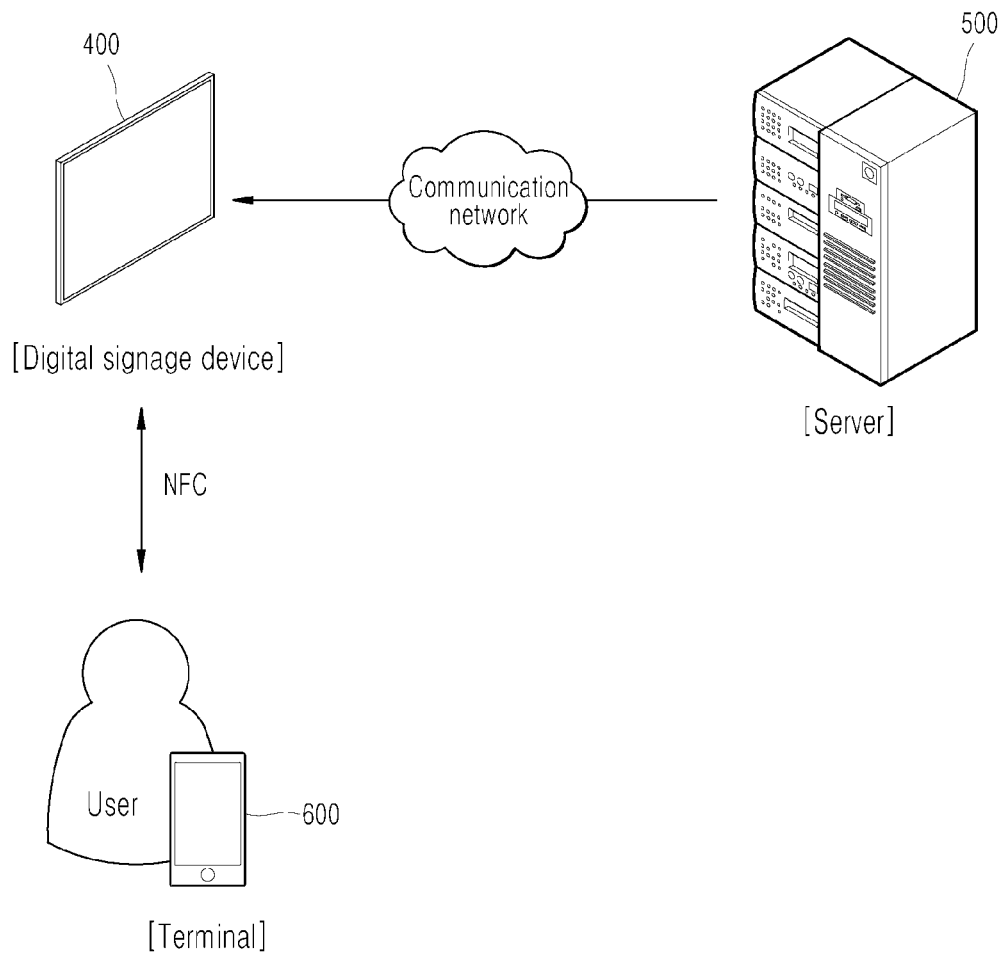
FIG. 9 is a diagram illustrating a schematic configuration of a contents providing system according to a second embodiment of the present disclosure.

FIG. 9 is a diagram illustrating a contents providing system according to the second embodiment of the present disclosure.

As illustrated in FIG. 9, the contents providing system according to the second embodiment of the present disclosure may be configured to include a digital signage device 400 configured to display contents on a display panel (screen), a server 500 configured to provide updated tagging information to the digital signage device 400, and a terminal 600 configured to acquire tagging information from the digital signage device 400.

The digital signage device 400 is a combination of various IT technologies, including hardware, software, contents, and networks, and refers to a digital information display (hereinafter, referred to as a DID) capable of displaying various types of information, such as still images and moving images, and various contents, such as advertisement data.

In general, the early type of the digital signage device 400 simply employs a display panel, which is made of a PDP (Plasma Display Panel), an LCD (Liquid Crystal Display), or a LED (Light Emitting Diode), as the signboard or billboard, thereby displaying contents through is the display panel.

In contrast, according to the second embodiment of the present disclosure, a tagging technology based on near field communication (hereinafter, referred to as NFC) is employed to enable a terminal 600, which has approached, to acquire tagging information related to contents currently displayed on the display panel.

In this regard, the contents displayed on the display panel may include multiple display objects, and such display objects may be independently displayed with regard to different topics or with regard to common topics in respective split areas, which are obtained by splitting the screen of the display panel in a square lattice pattern, or may be displayed in an arbitrary display position on the display panel with no separate split areas.

The contents, which are displayed on the display panel in this manner, may have been stored in the digital signage device 400 in advance, for example, or may be received from the digital signage device 400 through a communication network from the server 500 or from a separate contents server (not illustrated).

For reference, the NFC technology employed by the digital signage device 400 is a very short-range contactless data transfer technology related to RFID (radio frequency identification), and may be used for communication between devices positioned within a distance of 10 cm, for example.

The NFC provides a center frequency of 13.56 MHz, and may provide a transmission rate of 106, 212, and 424 kbps. The NFC may have compatibility with various contactless communication protocols.

For example, the NFC may have compatibility with protocols defined under ISO 14443 types A, B, F and ISO 18092.

An electronic device, which employs the NFC technology, may communicate with another electronic device, which employs the NFC technology, through at least one of a reader mode, a card emulation mode, and a peer-to-peer mode, for example.

The server 500 refers to a device configured to provide the digital signage device 400 with tagging information, which is to be updated by the digital signage device 400.

To this end, the server 500 has information regarding each display object inside the contents displayed by the digital signage device 400 (for example, detailed information, purchase information, and connection URL), and, when information related to each display object is updated, the updated information can be provided to the digital signage device 400.

The terminal 600 refers to a mobile device configured to acquire tagging information related to each display object inside the contents from the digital signage device 400.

The terminal 600 may be, for example, a smartphone, a tablet PC, or a PDA, but is not limited thereto, and may include every device that supports the NFC-based tagging technology.

On the other hand, it has been mentioned that, in connection with the digital signage device 400 according to the second embodiment of the present disclosure, the NFC-based tagging technology may be employed to enable the terminal, which has approached, to acquire information related to contents displayed on the display panel.

Tagging technology employed by the digital signage device 400 is normally operated such that a tag is placed in a separate space, besides the display panel on which contents are displayed, and the terminal 600 tags the same and acquires information.

However, such a scheme of placing a tag in a separate space, besides the display panel on which contents are displayed by the digital signage device 400, such that the terminal 600 tags the same, has a limit on intuitively delivering information related to each of various display objects that can be included in the contents.

Furthermore, it is usually impossible to update the information stored in the tag in real time, limiting the range of information that can be delivered to the terminal 600 to the range of information stored in the tag; therefore, it is not easy to provide various kinds of information related to the contents.

Furthermore, according to the scheme for displaying contents by the digital signage device 400, the same contents are repeatedly displayed in most cases; such repeated display of the same contents also involves a limitation in that the degree of interest of users in the corresponding contents may drop substantially.

Therefore, in order to resolve the above-mentioned limitations, the second embodiment of the present disclosure seeks to provide a scheme for selecting and displaying targeting contents with regard to a user, who has approached a display panel, and enabling the user to acquire tagging information, which has been updated with regard to each display object inside the to targeting contents, through a terminal 600; and the detailed configuration of a digital signage device 400 for implementing the same will now be described.

Figure 10:
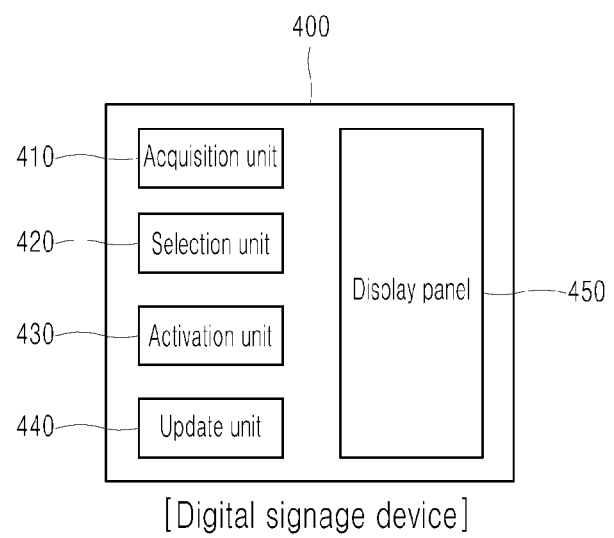
FIG. 10 is a diagram illustrating a schematic configuration of a digital signage device according to the second embodiment of the present disclosure.

In this connection, FIG. 10 illustrates a schematic configuration of the digital signage device 400 according to the second embodiment of the present disclosure.

As illustrated in FIG. 10, the digital signage device 400 according to the second embodiment of the present disclosure may be configured to include an acquisition unit 410 configured to acquire contents selection information; a selection unit 420 configured to select targeting contents; an activation unit 430 configured to activate a tag block inside a display panel 450 in connection with the targeting contents; and an update unit 440 configured to update tagging information inside the activated tag block.

The entire configuration of the digital signage device 400, which includes the above-mentioned acquisition unit 410, the selection unit 420, the activation unit 430, the update unit 140, and the display panel 450, or at least a part of the configuration, may be implemented as a software module, which is executed by a processor, or a hardware module, and may also be implemented as a combination of a software module and a hardware module.

On the other hand, the second embodiment of the present disclosure has such a structure that multiple tag blocks are directly mounted on the display panel 450, in order to deliver information related to a display object inside targeting contents, which are currently displayed on the display panel 450, to the terminal 600 more intuitively.

In this regard, FIG. 3 illustrates a schematic exploded perspective view of a conventional display panel, as described above.

As illustrated in FIG. 3, the conventional display panel may be configured as multiple layers including, for example, reinforced glass, PCAP touch film, liquid crystal, various films (polarizers), a light-guiding plate, a BLU, and a metal back plate.

The display panel 450 according to the second embodiment of the present disclosure has the same configuration as that of the conventional display panel described with reference to FIG. 3, and is also configured such that a tag layer, which has multiple tag blocks mounted thereon, is additionally inserted on the existing multiple layers.

In this regard, FIG. 4 illustrates a schematic exploded perspective view of the display panel 450 according to the first embodiment of the present disclosure, as described above.

The display panel 450 according to the second embodiment of the present disclosure may have, besides multiple layers that constitute a conventional display panel, such as reinforced to glass, PCAP touch film, liquid crystal, various films (polarizers), a light-guiding plate, a BLU, and a metal back plate, an NFC tag layer, which has multiple tag blocks mounted thereon, additionally inserted therein, as illustrated in FIG. 4.

The tag layer may be inserted, for example, into an upper layer adjacent to a layer among the multiple layers, on which targeting contents are substantially displayed (i.e. liquid crystal layer), as a larger tagging-enabling distance is requested, the tagging-enabling distance being a distance at which a terminal 600 that has approached the display panel 450 can acquire tag information; and, if the tagging-enabling distance is required to be equal to or larger than a threshold value, a ferrite sheet may be inserted together on the bottom surface.

In this case, the tag layer is inserted into the multiple layers, which constitute the conventional display panel, and can be configured to overlap with the multiple existing layers.

In this connection, the number of tag blocks mounted on the tag layer may be determined in view of the number of display objects that can be included in the targeting contents; assuming that the display objects are displayed in respective split areas obtained by splitting the screen of the display panel in a square lattice pattern, the number of tag blocks may be equal to that of the split areas; and the number of tag blocks may be larger than that of the split areas on the basis of each square lattice pattern that has a smaller size than that of the square lattice pattern on the screen of the display panel.

For reference, the ferrite sheet plays the role of a kind of reflecting plate, and can reflect an NFC signal, which is generated to the bottom surface of the tag layer, such that the same is directed towards the upper surface of the display panel 450, i.e. the direction in which contents are displayed.

As such, the display panel 450 according to the second embodiment of the present disclosure adopts such a structure that multiple layers, which constitute a conventional display panel, and a tag layer, on which multiple tag blocks are mounted, can be overlapped, making it unnecessary to provide a separate space for inserting a tag, besides the display panel 400 for displaying targeting contents by the digital signage device 400; and targeting contents, which are displayed on the display panel 450, and the tag block on the bottom surface are overlapped such that the terminal 600 can directly tag the targeting contents, making it possible to deliver intuitive information related to the contents.

In summary, the digital signage device 100 according to the second embodiment of the present disclosure enables the terminal 600, which has approached the display panel 450, to acquire tagging information, which has been updated with regard to each display object inside the contents displayed on the display panel 450, using the above features; hereinafter, each feature inside the digital signage device 100 to this end will be described in more detail.

The acquisition unit 410 performs the function of acquiring contents selection information for selecting targeting contents.

More particularly, when a user exits, and the distance between the user and the display panel 450 is within a threshold value, the acquisition unit 410 acquires contents selection information related to the corresponding user.

In this regard, the contents selection information refers to information related to the user, who is adjacent to the display panel 450, and may be, for example, user setting information, which is received from the terminal 600 that has approached the display panel 450, or user recognition information, which is related to recognition of the user who is adjacent to the display panel 450.

The user setting information refers to information set by the user through an application, which is installed in the terminal 600, and may correspond to the user's age, gender, and product groups of interest, for example.

The user setting information may be received from a terminal 600 which has recognized that, on the basis of the strength (RSSI) of a radio signal (for example, BLE) transmitted by the digital signage device 400, the distance between the terminal 600 and the display panel 450 is within a threshold value.

In this regard, the acquisition unit 410 transmits a radio signal (for example, BLE) continuously or periodically through a communication device, which is mounted on the digital signage device 400; and, when the terminal 600 recognizes that the distance between the same and the display panel 450 is within a threshold value on the basis of the strength (RSSI) of the corresponding radio signal (for example, BLE), the user setting information can be received from the terminal 600.

The user recognition information refers to the result of recognizing the user through a camera, and may correspond to the gender, age, and the like, for example.

In this regard, when it is confirmed through a separate sensing device (not illustrated) that the user has approached, the acquisition unit 410 takes an image of the user through the camera mounted on the digital signage device 400 and recognizes the taken image, thereby acquiring the user recognition information.

The selection unit 420 performs the function of selecting targeting contents.

More particularly, assuming that contents selection information has been acquired, the selection unit 420 directly selects contents, which have been classified and stored with reference to the contents selection information, as targeting contents among pre-stored contents, or transmits the contents selection information to the server 300 or to a separate contents server (not illustrated) such that contents, which have been classified and stored with reference to the corresponding contents selection information, can be received as recommended contents.

The activation unit 430 plays the role of activating a tag block mounted on the display panel 450.

More particularly, the activation unit 430 activates at least portion of tag block among the tag blocks, which are mounted inside the display panel 450, on the basis of the display position of each display object within the targeting contents displayed on the display panel 450.

In this case, the activation unit 430 confirms the display position on the display panel 450 with regard to each display object, and activates only at least portion of tag block, which are mounted in positions that overlap with the display position on the display panel 450, among the multiple tag blocks.

It would be obvious that the remaining tag blocks, which are confirmed as not overlapping with the display position on the display panel 450, switch to a non-activated state or maintain the existing non-activated state.

On the other hand, it could be assumed, as illustrated in FIG. 5, that two or more tag blocks (a,b,c,d,e,f,g,h,i) are mounted in positions that overlap with the display position of a specific display object.

In this case, the activation unit 430 activates at least some of the two or more tag blocks (a,b,c,d,e,f,g,h,i) on the basis of the correlation between the specific display object and the contents selection information.

When the correlation between the specific display object and the contents selection information is equal to or larger than a threshold value, the activation unit 430 may activate all of the two or more tag blocks (a,b,c,d,e,f,g,h,i), which are mounted in positions that overlap with the display position of the specific display object.

It could be understood, if the correlation between the specific display object and the contents selection information is equal to or higher than the threshold value, that the user, who has approached the display panel 450, has a high degree of interest in the specific display object; therefore, all of the two or more tag blocks (a,b,c,d,e,f,g,h,i), which are mounted in positions that overlap with the display position of the specific display object, are activated, thereby increasing the probability that tagging information related to the specific display object will be delivered to the terminal 600.

On the other hand, when the correlation between the specific display object and the contents selection information is less than the threshold value, the activation unit 430 may activate only some tag blocks (e) among the two or more tag blocks (a,b,c,d,e,f,g,h,i), which are mounted in positions that overlap with the display position of the specific display object.

It could be understood, if the correlation between the specific display object and the contents selection information is less than the threshold value, that the user, who has approached the display panel 450, has an average or low level of interest in the specific display object; therefore, only some tag blocks (e) of the two or more tag blocks (a,b,c,d, e,f,g,h,i), which are mounted in positions that overlap with the display position of the specific display object, are activated, thereby maintaining or lowering the probability that tagging information related to the specific display object will be delivered to the terminal 600.

It would be obvious, for reference, that the correlation between the specific display object and the contents selection information can be determined through various determination algorithms, with no limit on the manner of determination.

It could also be assumed, as illustrated in FIG. 6, that two or more tag blocks (a,b,c,d,e,f,g,h,i) are mounted in positions that overlap with the display position of a specific display object, and some tag blocks (f,i) among the two or more tag blocks (a,b,c,d,e,f,g,h,i) are mounted in positions that overlap with the display position of another display object.

In this case, the activation unit 430 activates only the remaining tag blocks (a,b,c,d,e,g,h), other than the at least portion of tag block (f,i), among the two or more tag blocks (a,b,c,d,e,f,g,h,i).

Such activation of only the remaining tag blocks (a,b,c, d,e,g,h), other than some tag blocks (f,i), when two or more tag blocks (a,b,c,d,e,f,g,h,i) are mounted in positions that overlap with the display position of a specific display object, and when some tag blocks (f,i) among the two or more tag blocks (a,b,c,d,e,f,g,h,i) are mounted in positions that overlap with the display position of another display object, is for the purpose of preventing delivery of erroneous tagging information to the terminal 600 as a result of a tagging operation in the boundary area.

The update unit 140 performs the function of updating tagging information regarding an activated tag block.

More specifically, assuming that a tag block, which is mounted in a position that overlaps with the display position of each display object inside targeting contents, has completely been activated, and information related to each display object needs to be updated, the update unit 140 updates tagging information regarding the activated tag block using tagging information received from the server 500 such that the terminal 600, which has approached the display panel, can acquire the updated tag information from each activated tag block.

In this case, the updated tagging information regarding the activated tag block may be received in real time from the server 500 or may be received from the server 500 at the request of the update unit 140; and it could be considered, if updated tagging information is received from the server 500, that information related to each display object needs to be updated.

Each feature inside the digital signage device 400, described above, may be implemented as a software module, which is executed by a processor, or as a hardware module, or may be implemented as a combination of a software module and a hardware module, as described above.

Such a software module executed by a processor, a hardware module, or a combination of a software module and a hardware module may be implemented as a hardware system (for example, computer system).

Therefore, a hardware system 2000 for implementing the digital signage device 400 according to the second embodiment of the present disclosure will now be described with reference to FIG. 11.

It is to be noted, for reference, that an example for implementing each feature inside the digital signage device 400, described above, inside the hardware system 2000 will be described now, and each feature and the corresponding operation may different from those of the actual system.

Figure 11:
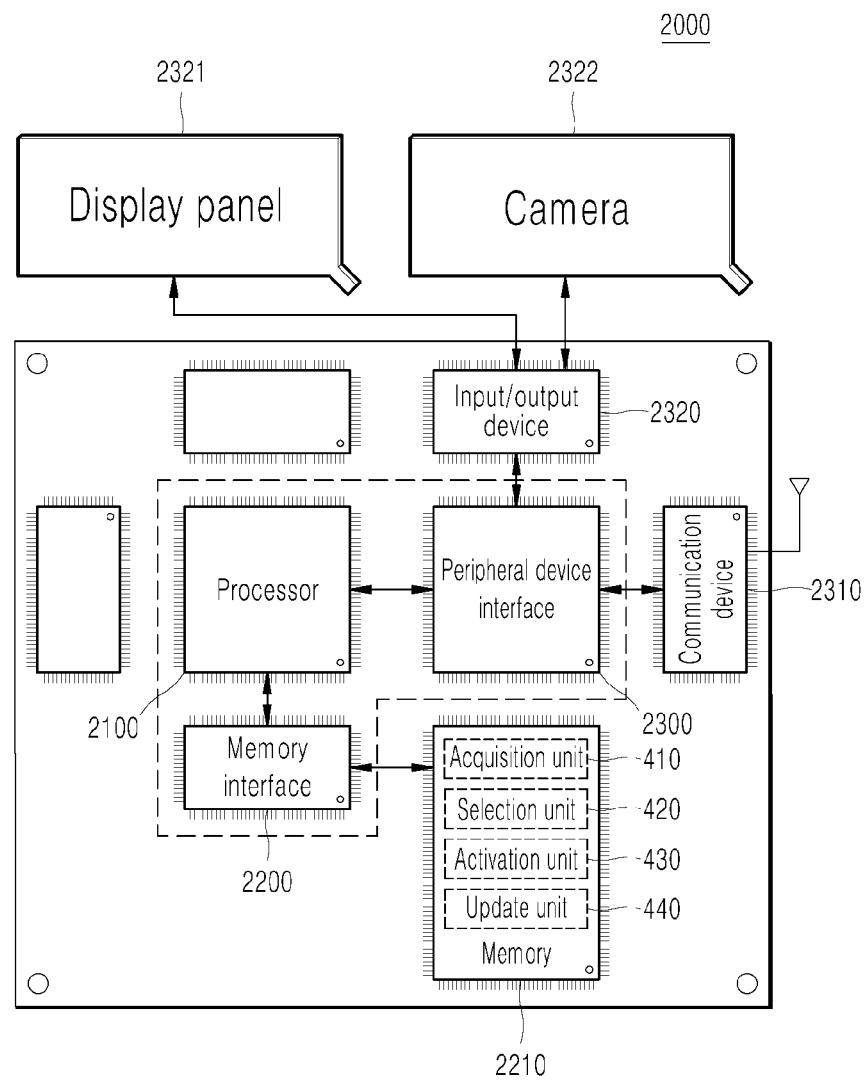
FIG. 11 is a diagram illustrating a schematic configuration of a hardware system for implementing a digital signage device according to the second embodiment of the present disclosure.

FIG. 11 is a diagram illustrating the structure of a hardware system 2000 for implementing the digital signage device 400 according to the second embodiment of the present disclosure.

As illustrated in FIG. 11, the hardware system 2000 according to the second embodiment of the present disclosure may be configured to include a processor 2100, a memory interface 2200, and a peripheral device interface 2300.

Each feature inside the hardware system 2000, described above, may be an individual component or may be integrated with at least one integrated circuit, and respective features may be coupled to a bus system (not illustrated).

In this regard, the bus system corresponds to an abstraction that represents one or more arbitrary individual physical buses, which are connected by proper bridges, adapters, and/or controllers, communication lines/interfaces, and/or multi-drop or point-to-point connections.

The processor 2100 plays the role of communicating with a memory 2200 through a memory interface 2210, in order to perform various functions in the hardware system, thereby executing various software modules stored in the memory 2210.

In this case, respective features inside the digital signage device 400, i.e. the acquisition unit 410, the selection unit 420, the activation unit 430, and the update unit 140, which have been described with reference to FIG. 10, can be stored as software modules, and other operating systems may also be stored additionally.

The operating system (for example, an embedded operating system such as I-OS, Android, Darwin, RTXC, LINUX, UNIX, OS X, WINDOWS, or VxWorks) includes various procedures, command sets, software components and/or drivers, which are used to control and manage normal system operations (for example, memory management, storage device control, and power management) and play the role of facilitating communication between various hardware modules and software modules.

For reference, the memory 2210 includes a cache, a main memory, and a secondary memory, but may also include a memory hierarchy that is not limited thereto, and the memory hierarchy may be implemented through any combination of a RAM (for example, an SRM, a DRAM, a DDDRM), a ROM, a flash memory, a magnetic and/or optical storage device (for example, a disk drive, a magnetic tape, a CD (compact disc), and a DVD (digital video disc)).

The peripheral device interface 2300 plays the role of enabling communication between the processor 2100 and peripheral devices.

The peripheral devices are for the purpose of providing the computer system with different functions, and may include a communication device 2310 and an input/output device 2320, for example, in the second embodiment of the present disclosure.

The communication device 2310 plays the role of providing a function of communication with another device and, to this end, includes an antenna system, an RF transceiver, at least one amplifier, a tuner, at least one oscillator, a digital signal processor, a codec chipset, and a memory, for example, but is not limited thereto, and may also include a widely known circuit that performs the above functions.

Communication protocols supported by the communication device 2310 may include, for example, protocols for LTE (long term evolution), TDMA (time division multiple access), CDMA (code division multiple access), GSM (global system for mobile communications), EDGE (enhanced data GSM environment), W-CDMA (wideband code division multiple access), Wi-Fi (IEEE 802.11a, IEEE 802.11b, IEEE 802.11g and/or IEEE 802.11n etc.), Bluetooth, Wi-MAX, VoIP (voice over Internet Protocol), email, instant messaging, and SMS (short message service), but are not limited thereto, and may include any protocols that provide environments for communication with another device.

The input/output device 2320 plays the role of a controller for controlling I/O devices that interwork with other hardware systems and, in the second embodiment of the present disclosure, is in charge of control of the display panel 2321 (having the same configuration of reference numeral 450 in FIG. 9), the camera 2322, and the like.

In this case, as illustrated in FIG. 4, the display panel 2321 according to the second embodiment of the present disclosure has, besides multiple layers that constitute the conventional display panel, such as glass, PCAP touch film, liquid crystal, various films (polarizers), a light-guiding plate, a BLU, and a metal back plate, an NFC tag layer, which has multiple tag blocks mounted thereon, additionally inserted therein.

The tag layer may be inserted, for example, into an upper layer adjacent to a layer among the multiple layers, on which contents are substantially displayed (i.e. liquid crystal layer), as a larger tagging-enabling distance is requested, the tagging-enabling distance being a distance at which a terminal 600 that has approached the display panel 2321 can acquire tag information; and, if the tagging-enabling distance is required to be equal to or larger than a threshold value, a ferrite sheet may be inserted together on the bottom surface.

In this case, the tag layer is inserted into the multiple layers, which constitute the conventional display panel, and can be configured to overlap with the multiple existing layers.

In this connection, the number of tag blocks mounted on the tag layer may be determined in view of the number of display objects that can be included in the targeting contents; assuming that the display objects are displayed in respective split areas obtained by splitting the screen of the display panel in a square lattice pattern, the number of tag blocks may be equal to that of the split areas; and the number of tag blocks may be larger than that of the split areas on the basis of each square lattice pattern that has a smaller size than that of the square lattice pattern on the screen of the display panel.

For reference, the ferrite sheet plays the role of a kind of reflecting plate, and can reflect an NFC signal, which is generated to the bottom surface of the tag layer, such that the same is directed towards the upper surface of the display panel 2321, i.e. the direction in which contents are displayed.

In addition, control of multiple tag blocks mounted on the tag layer may be conducted through a port, such as 12C/UART/SPI.

In summary, each feature inside the digital signage device 400, which is stored as a software module in the memory 2210, conducts communication with the communication device 2310 and the input/output device 2320 via the memory interface 1100 and the peripheral device interface 2300, when executed by a processor 2100, such that a terminal 600, which has approached the display panel 2321, can acquire tagging information that has been updated with regard to each display object inside the targeting contents displayed on the display panel 2321.

Hereinafter, each feature inside the hardware system 2000 for implementing the digital signage device 400 will be described in more detail.

It will be assumed for convenience of description that the activation unit 410, the selection unit 420, the activation unit 430, and the update unit 140, which are respective features inside the digital signage device 400 stored as software modules in the memory 2210, have been executed by a processor 2100.

The acquisition unit 410 performs the function of acquiring contents selection information for selecting targeting contents.

More particularly, when a user exits, and when the distance between the user and the display panel 2321 is within a threshold value, the acquisition unit 410 acquires contents selection information related to the corresponding user and delivers the acquisition result to the selection unit 420.

In this regard, the contents selection information refers to information related to the user, who is adjacent to the display panel 2321, and may be, for example, user setting information, which is received from the terminal 600 that has approached the display panel 2321, or user recognition information, which is related to recognition of the user who is adjacent to the display panel 2321.

The user setting information refers to information set by the user through an application, which is installed in the terminal 600, and may correspond to the user's age, gender, and product groups of interest, for example.

The user setting information may be received from a terminal 600 which has recognized that, on the basis of the strength (RSSI) of a radio signal (for example, BLE) transmitted by the digital signage device 400, the distance between the terminal 600 and the display panel 2321 is within a threshold value.

In this regard, the acquisition unit 410 transmits a radio signal (for example, BLE) continuously or periodically through the communication device 2310, which is mounted on the digital signage device 400; and, when the terminal 600 recognizes that the distance between the same and the display panel 450 is within a threshold value on the basis of the strength (RSSI) of the corresponding radio signal (for example, BLE), the user setting information can be received from the terminal 600.

The user recognition information refers to the result of recognizing the user through a camera 2322, and may correspond to the gender, age, and the like, for example.

In this regard, when it is confirmed through a separate sensing device (not illustrated) that the user has approached, the acquisition unit 410 takes an image of the user through the camera 2322 mounted on the digital signage device 400 and recognizes the taken image, thereby acquiring the user recognition information.

The selection unit 420 performs the function of selecting targeting contents.

More particularly, assuming that acquired contents selection information has been received from the acquisition unit 410, the selection unit 420 selects targeting contents, which are contents that have been targeted, on the basis of the contents selection information, and delivers the result to the activation unit 430.

In this case, the selection unit 420 directly selects contents, which have been classified and stored with reference to the contents selection information, as targeting contents among pre-stored contents, or transmits the contents selection information to the server 300 or to a separate contents server (not illustrated) through the communication device 2310 such that contents, which have been classified and stored with reference to the corresponding contents selection information, can be received as recommended contents.

The activation unit 430 plays the role of activating a tag block mounted on the display panel 450.

More particularly, the activation unit 430 activates at least portion of tag block among the tag blocks, which are mounted inside the display panel 450, on the basis of the display position of each display object within the contents displayed on the display panel 2321, and to delivers the activation result to the update unit 140.

In this case, the activation unit 430 confirms the display position on the display panel 2320 with regard to each display object through the input/output device 2321, activates only at least portion of tag block, which are mounted in positions that overlap with the display position on the display panel 2321, among the multiple tag blocks, and delivers the result of activation to the update unit 140.

It would be obvious that the remaining tag blocks, which are confirmed as not overlapping with the display position on the display panel 2321, switch to a non-activated state or maintain the existing non-activated state.

On the other hand, it could be assumed, as illustrated in FIG. 5, that two or more tag blocks (a,b,c,d,e,f,g,h,i) are mounted in positions that overlap with the display position of a specific display object.

In this case, the activation unit 430 activates at least some of the two or more tag blocks (a,b,c,d,e,f,g,h,i) on the basis of the correlation between the specific display object and the contents selection information.

When the correlation between the specific display object and the contents selection information is equal to or larger than a threshold value, the activation unit 430 may activate all of the two or more tag blocks (a,b,c,d,e,f,g,h,i), which are mounted in positions that overlap with the display position of the specific display object.

It could be understood, if the correlation between the specific display object and the contents selection information is equal to or higher than the threshold value, that the user, who has approached the display panel 2321, has a high degree of interest in the specific display object; therefore, all of the two or more tag blocks (a,b,c,d,e,f,g,h,i), which are mounted in positions that overlap with the display position of the specific display object, are activated, thereby increasing the probability that tagging information related to the specific display object will be delivered to the terminal 600.

On the other hand, when the correlation between the specific display object and the contents selection information is less than the threshold value, the activation unit 430 may activate only some tag blocks (e) among the two or more tag blocks (a,b,c,d,e,f,g,h,i), which are mounted in positions that overlap with the display position of the specific display object.

It could be understood, if the correlation between the specific display object and the contents selection information is less than the threshold value, that the user, who has approached the display panel 2321, has an average or low level of interest in the specific display object; therefore, only some tag blocks (e) of the two or more tag blocks (a,b,c,d, e,f,g,h,i), which are mounted in positions that overlap with the display position of the specific display object, are activated, thereby maintaining or lowering the probability that tagging information related to the specific display object will be delivered to the terminal 600.

It would be obvious, for reference, that the correlation between the specific display object and the contents selection information can be determined through various determination algorithms, with no limit on the manner of determination.

It could also be assumed, as illustrated in FIG. 6, that two or more tag blocks (a,b,c,d,e,f,g,h,i) are mounted in positions that overlap with the display position of a specific display object, and some tag blocks (f,i) among the two or more tag blocks (a,b,c,d,e,f,g,h,i) are mounted in positions that overlap with the display position of another display object.

In this case, the activation unit 430 activates only the remaining tag blocks (a,b,c,d,e,g,h), other than the at least portion of tag block (f,i), among the two or more tag blocks (a,b,c,d,e,f,g,h,i).

Such activation of only the remaining tag blocks (a,b,c, d,e,g,h), other than some tag blocks (f,i), when two or more tag blocks (a,b,c,d,e,f,g,h,i) are mounted in positions that overlap with the display position of a specific display object, and when some tag blocks (f,i) among the two or more tag blocks (a,b,c,d,e,f,g,h,i) are mounted in positions that overlap with the display position of another display object, is for the purpose of preventing delivery of erroneous tagging information to the terminal 600 as a result of a tagging operation in the boundary area.

The update unit 140 performs the function of updating tagging information regarding an activated tag block.

More specifically, assuming that a result of activating a tag block is received from the activation unit 430, and information related to each display object needs to be updated, the update unit 140 updates tagging information regarding the activated tag block using tagging information received from the server 500 through the communication device 2310 such that the terminal 600, which has approached the display panel 2321, can acquire the updated tag information from each activated tag block.

In this case, the updated tagging information regarding the activated tag block can be received in real time from the server 500 through the communication device 2310, or can be received from the server 500 at the request of the update unit 140 through the communication device 2310.

As described above, according to the digital signage device 400 according to the second embodiment of the present disclosure and the hardware system 2000 for implementing the same, targeting contents are selected and displayed with regard to a user, who has approached the display panel 150, 1321, thereby increasing the degree of interest of the user in the contents displayed on the digital signage device 400. In addition, a tag block related to each display object inside targeting contents, among the multiple tag blocks mounted inside the display panel 150, 1321, is activated, and tagging information inside the activated tag block is updated using tagging information received from the server 300; as a result, the terminal 600, which has approached the display panel 450, can acquire tagging information related to each display object inside the targeting contents intuitively, and new or various kinds of information related to each display object inside the targeting contents can be provided through the corresponding tagging information.

Figure 12:
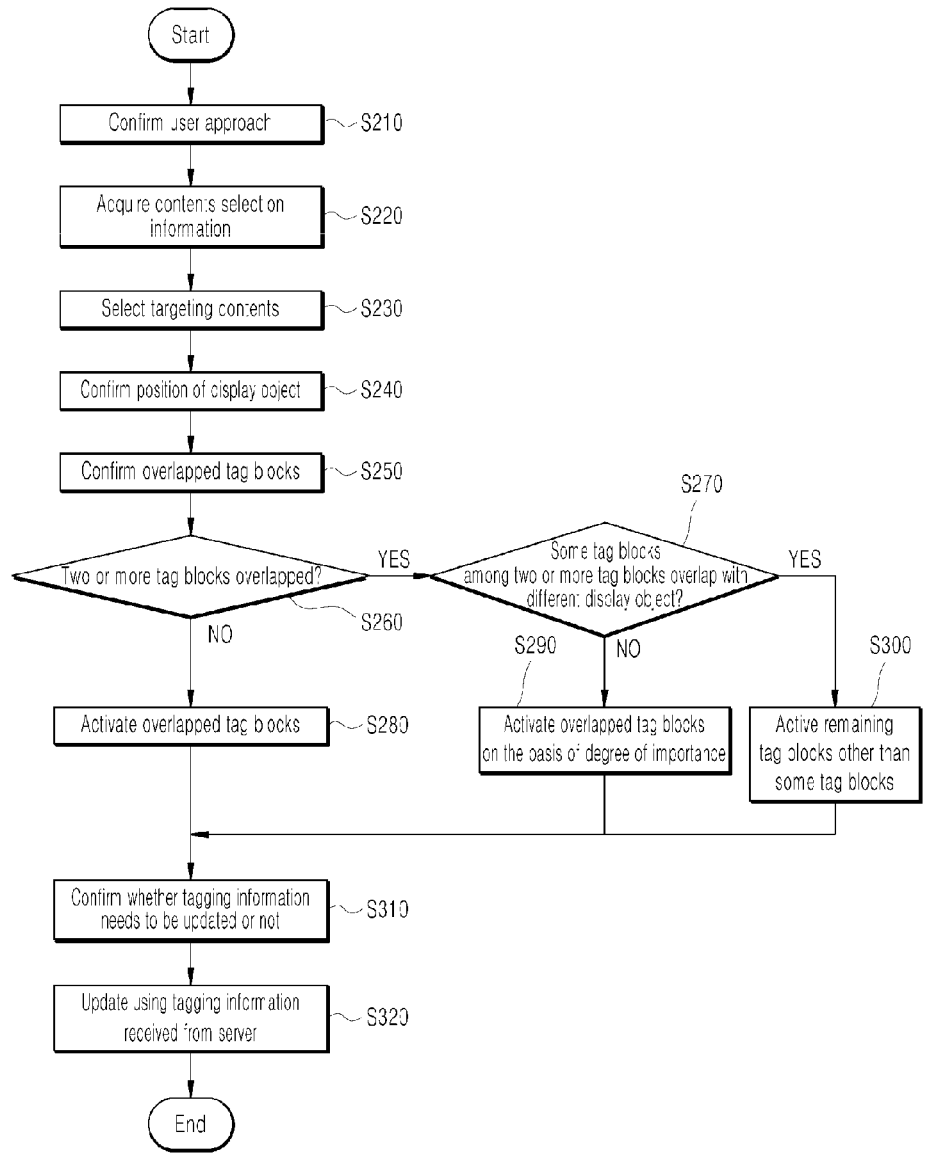
FIG. 12 is a flowchart illustrating the flow of operation ins a digital signage device according to the second embodiment of the present disclosure.

Having described the digital signage device 400 according to the second embodiment of the present disclosure and the hardware system 2000 for implementing the digital signage device 400, the flow of operation in the digital signage device 400 according to the second embodiment of the present disclosure will now be described with reference to FIG. 12.

Firstly, when a user exists, and when the distance between the user and the display panel 450 is within a threshold value, the acquisition unit 410 acquires contents selection information related to the corresponding user according to steps S210 and S220.

In this regard, the contents selection information refers to information related to the user, who is adjacent to the display panel 450, and may be, for example, user setting information, which is received from the terminal 600 that has approached the display panel 450, or user recognition information, which is related to recognition of the user who is adjacent to the display panel 450.

The user setting information refers to information set by the user through an application, which is installed in the terminal 600, and may correspond to the user's age, gender, and product groups of interest, for example.

The user setting information may be received from a terminal 600 which has recognized that, on the basis of the strength (RSSI) of a radio signal (for example, BLE) transmitted by the digital signage device 400, the distance between the terminal 600 and the display panel 450 is within a threshold value.

In this regard, the acquisition unit 410 transmits a radio signal (for example, BLE) continuously or periodically through a communication device, which is mounted on the digital signage device 400; and, when the terminal 600 recognizes that the distance between the same and the display panel 450 is within a threshold value on the basis of the strength (RSSI) of the corresponding radio signal (for example, BLE), the user setting information can be received from the terminal 600.

The user recognition information refers to the result of recognizing the user through a camera, and may correspond to the gender, age, and the like, for example.

In this regard, when it is confirmed through a separate sensing device (not illustrated) that the user has approached, the acquisition unit 410 takes an image of the user through the camera mounted on the digital signage device 400 and recognizes the taken image, thereby acquiring the user recognition information.

Thereafter, assuming that contents selection information has been acquired, the selection unit 420 directly selects contents, which have been classified and stored with reference to the contents selection information, as targeting contents among pre-stored contents, or transmits the contents selection information to the server 300 or to a separate contents server (not illustrated) according to step S230 such that contents, which have been classified and stored with reference to the corresponding contents selection information, can be received as recommended contents.

The activation unit 430 then activates at least portion of tag block among multiple tag blocks, which are mounted inside the display panel 450, on the basis of the display position of each display object within the targeting contents displayed on the display panel 450, through steps S240 to S300.

In this case, the activation unit 430 confirms the display position on the display panel 450 with regard to each display object, and activates only at least portion of tag block, which are mounted in positions that overlap with the display position on the display panel 450, among the multiple tag blocks.

It would be obvious that the remaining tag blocks, which are confirmed as not overlapping with the display position on the display panel 450, switch to a non-activated state or maintain the existing non-activated state.

When it is confirmed in step S260 that two or more tag blocks (a,b,c,d,e,f,g,h,i) are mounted in positions that overlap with the display position of a specific display object as illustrated in FIG. 5, the activation unit 430 activates at least portion of tag block among the two or more tag blocks (a,b,c,d,e,f,g,h,i) on the basis of the degree of importance of the specific display object inside the contents, through step S270.

When the degree of importance of the specific display object within the contents is equal to or larger than a threshold value, the activation unit 430 may activate all of the two or more tag blocks (a,b,c,d,e,f,g,h,i), which are mounted in positions that overlap with the display position of the specific display object.

It could be understood, if the correlation between the specific display object and the contents selection information is equal to or higher than the threshold value, that the user, who has approached the display panel 450, has a high degree of interest in the specific display object; therefore, all of the two or more tag blocks (a,b,c,d,e,f,g,h,i), which are mounted in positions that overlap with the display position of the specific display object, are activated, thereby increasing the probability that tagging information related to the specific display object will be delivered to the terminal 600.

On the other hand, when the correlation between the specific display object and the contents selection information is less than the threshold value, the activation unit 430 may activate only some tag blocks (e) among the two or more tag blocks (a,b,c,d,e,f,g,h,i), which are mounted in positions that overlap with the display position of the specific display object.

It could be understood, if the correlation between the specific display object and the contents selection information is less than the threshold value, that the user, who has approached the display panel 450, has an average or low level of interest in the specific display object; therefore, only some tag blocks (e) of the two or more tag blocks (a,b,c,d,e,f,g,h,i), which are mounted in positions that overlap with the display position of the specific display object, are activated, thereby maintaining or lowering the probability that tagging information related to the specific display object will be delivered to the terminal 600.

In addition, when it is confirmed in steps S260 and S270 that two or more tag blocks (a,b,c,d,e,f,g,h,i) are mounted in positions that overlap with the display position of a specific display object, and some tag blocks (f,i) among the two or more tag blocks (a,b,c,d,e,f,g,h,i) are mounted in positions that overlap with the display position of another display object, as illustrated in FIG. 6, the activation unit 430 activates only the remaining tag blocks (a,b,c,d,e,g,h), other than the at least some blocks (f,i), among the two or more tag blocks (a,b,c,d,e,f,g,h,i), through step S200.

Such activation of only the remaining tag blocks (a,b,c,d,e,g,h), other than some tag blocks (f,i), when two or more tag blocks (a,b,c,d,e,f,g,h,i) are mounted in positions that overlap with the display position of a specific display object, and when some tag blocks (f,i) among the two or more tag blocks (a,b,c,d,e,f,g,h,i) are mounted in positions that overlap with the display position of another display object, is for the purpose of preventing delivery of erroneous tagging information to the terminal 600 as a result of a tagging operation in the boundary area.

Thereafter, when it is confirmed through steps S230 to S300 that a tag block, which is mounted in a position that overlaps with the display position of each display object inside targeting contents, has completely been activated, and when it is confirmed through step S310 that information related to each display object needs to be updated, the update unit 140 updates tagging information regarding the activated tag block using tagging information received from the server 500, according to step S320, such that the terminal 600, which has approached the display panel, can acquire the updated tag information from each activated tag block.

In this case, the updated tagging information regarding the activated tag block may be received in real time from the server 500 or may be received from the server 500 at the request of the update unit 140; and it could be considered, if updated tagging information is received from the server 500, that information related to each display object needs to be updated.

As described above, according to the flow of operation in the digital signage device 400 according to the second embodiment of the present disclosure, targeting contents are selected and displayed with regard to a user, who has approached the display panel 450, thereby increasing the degree of interest of the user in the contents displayed on the digital signage device 400. In addition, a tag block related to each display object inside targeting contents, among the multiple tag blocks mounted inside the display panel 450, is activated, and tagging information inside the activated tag block is updated using tagging information received from the server 300; as a result, the terminal 600, which has approached the display panel 450, can acquire tagging information related to each display object inside the targeting contents intuitively, and new or various kinds of information related to each display object inside the targeting contents can be provided through the corresponding tagging information.

The implementations of the functional operations and subject matter described in the present disclosure may be realized by a digital electronic circuit, by the structure described in the present disclosure and the equivalent including computer software, firmware, or hardware including, or by a combination of one or more thereof. Implementations of the subject matter described in the specification may be implemented in one or more computer program products, that is, one or more modules related to a computer program command encoded on a tangible to program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

Implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should not be understood that the operations are performed in the shown specific sequence or that all shown operations are performed in order to obtain a preferable result. In a specific case, a multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

The invention claimed is:

1. A digital signage device comprising:
a processor configured to perform process related to tag information; and
a memory in which at least one command executed by the processor is stored, wherein the at least one command comprises:
an activation command configured to activate, on the basis of contents displayed on a display panel, at least portion of multiple tag blocks that are mounted in positions related to the display panel; and
an update command configured to update, when tag information related to the contents needs to be updated with regard to each of the at least portion of tag block, tag information regarding each of the at least portion of tag block using tag information received from a server, thereby enabling a terminal approaching the display panel to acquire updated tag information from each of the at least portion of the tag blocks,
wherein the at least portion of the tag blocks activated by the activation command corresponds to a display object included in the contents, and
when two or more of the tag blocks correspond to a specific display object included in the contents, at least some of the tag blocks among the two or more tag blocks is activated on the basis of a degree of importance of the specific display object.

2. The digital signage device of claim 1, wherein the positions related to the display panel comprise a position of insertion of a tag layer, on which multiple tag blocks are mounted, on multiple layers, which constitute the display panel, such that the multiple layers and the tag layer can be overlapped.

3. The digital signage device of claim 2, wherein the tag layer is inserted into an upper layer adjacent to a liquid crystal layer that is a layer on which the contents are displayed, among the multiple layers, as a larger tagging-enabling distance is required, the tagging-enabling distance being a distance at which the terminal that has approached the display panel can acquire tag information, and, when it is requested that the tagging-enabling distance be equal to or larger than a threshold value, a ferrite sheet is inserted together into a lower layer.

4. The digital signage device of claim 1, wherein the contents comprise multiple display objects displayed in different positions on the display panel, and the at least portion of tag block comprises a tag block mounted in a position related to a display position of each of the multiple display objects among the multiple tag blocks.

5. The digital signage device of claim 4, wherein the activation command is configured such that, when two or more tag blocks are mounted in positions related to a display position of a specific display object inside the contents, at least portion of tag block among the two or more tag blocks is activated on the basis of the degree of importance of the specific display object inside the contents.

6. The digital signage device of claim 5, wherein the activation command is configured such that, when the degree of importance of the specific display object inside the contents is equal to or higher than a threshold value, all of the two or more tag blocks are activated, and, when the degree of importance of the specific display object inside the contents is below the threshold value, at least portion of tag blocks among the two or more blocks is activated, the difference in distance between the display position of the specific display object and mounted positions of the at least portion of tag block being less than a threshold value.

7. The digital signage device of claim 4, wherein the activation command is configured such that, when two or more tag blocks are mounted in positions related to a display position of a specific display object inside the contents, and when a portion of tag block among the two or more tag blocks are overlappingly related to a display position of a different display object inside the contents, remaining tag blocks, other than the portion of tag block, is activated.

8. A digital signage device operating method comprising:
activating, on the basis of contents displayed on a display panel, at least portion of multiple tag blocks that are mounted in positions related to the display panel; and
updating, when tag information related to the contents needs to be updated with regard to each of the at least portion of tag block, tag information regarding each of the at least portion of the tag blocks using tag information received from a server, thereby enabling a terminal approaching the display panel to acquire updated tag information from each of the at least portion of the tag blocks,
wherein the at least portion of the tag blocks activated by the activation command corresponds to a display object included in the contents, and
when two or more of the tag blocks correspond to a specific display object included in the contents, at least some of the tag blocks among the two or more tag blocks is activated on the basis of a degree of importance of the specific display object.

9. The digital signage device operating method of claim 8, wherein the contents comprise multiple display objects displayed in different positions on the display panel, and the at least portion of tag block comprise a tag block mounted in a position related to a display position of each of the multiple display objects among the multiple tag blocks.

10. The digital signage device operating method of claim 9, wherein, in the activating, when two or more tag blocks are mounted in positions related to a display position of a specific display object inside the contents, at least portion of tag block among the two or more tag blocks are activated on the basis of the degree of importance of the specific display object inside the contents.

11. The digital signage device operating method of claim 10, wherein, in the activating, when the degree of importance of the specific display object inside the contents is equal to or higher than a threshold value, all of the two or more tag blocks are activated, and, when the degree of importance of the specific display object inside the contents is below the threshold value, at least portion of tag block among the two or more blocks are activated, the difference in distance between the display position of the specific display object and mounted positions of the at least portion of tag block being less than a threshold value.

12. The digital signage device operating method of claim 9, wherein, in the activating, when two or more tag blocks are mounted in positions related to a display position of a specific display object inside the contents, and when a portion of tag blocks among the two or more tag blocks are overlappingly related to a display position of a different display object inside the contents, remaining tag blocks, other than the portion of tag block, is activated.

13. A digital signage device comprising:
  a processor configured to perform process related to tag information; and
  a memory in which at least one command executed by the processor is stored, wherein the at least one command comprises:
    an acquisition command configured to acquire, when a distance between a terminal of a user and a display panel is within a threshold value, contents selection information related to the user to enable targeting contents regarding the user to be selected on the basis of the contents selection information;
    an activation command configured to activate, on the basis of the targeting contents, at least portion of multiple tag blocks that are mounted in positions related to the display panel; and
    an update command configured to update, when tag information related to the targeting contents needs to be updated with regard to each of the at least portion of the tag blocks, tag information regarding each of the at least portion of tag block using tag information received from a server to enable updated tag information to be acquired by the terminal from each of the at least portion of tag block,
  wherein the at least portion of the tag blocks activated by the activation command corresponds to a display object included in the contents, and
  when two or more of the tag blocks correspond to a specific display object included in the contents, at least some of the tag blocks among the two or more tag blocks is activated on the basis of a degree of importance of the specific display object.

14. The digital signage device of claim 13, wherein the contents selection information comprises at least one of user setting information and user recognition information, the user setting information being transmitted by a terminal, which has recognized that the distance between the terminal and the display panel is within a threshold value on the basis of strength of a radio signal received from the digital signage device, and the user recognition information corresponding to a result of recognizing the user through a camera mounted on the digital signage device.

15. The digital signage device of claim 13, wherein the targeting contents comprise multiple display objects displayed in different display positions on the display panel, and the at least portion of tag block comprise a tag block mounted in a position related to a display position of each of the multiple display objects.

16. The digital signage device of claim 15, wherein the activation command is configured such that, when two or more tag blocks are mounted in positions related to a display position of a specific display object inside the contents, at least portion of the two or more tag blocks are activated on the basis of correlation between the specific display object and the contents selection information.

17. The digital signage device of claim 16, wherein the activation command is configured such that, when the correlation between the specific display object and the contents selection information is equal to or higher than a threshold value, all of the two or more tag blocks are activated, and, when the correlation between the specific display object and the contents selection information is below the threshold value, at least portion of tag block among the two or more blocks are activated, the difference in distance between the display position of the specific display object and mounted positions of the at least portion of tag block being less than a threshold value.

18. The digital signage device of claim 15, wherein the activation command is configured such that, when two or more tag blocks are mounted in positions related to a display position of a specific display object inside the contents, and when a portion of tag blocks among the two or more tag blocks are overlappingly related to a display position of a different display object inside the contents, remaining tag blocks, other than the portion of tag blocks, is activated.

19. The digital signage device of claim 13, wherein the positions related to the display panel comprises a position of insertion of a tag layer, on which multiple tag blocks are mounted, on multiple layers, which constitute the display panel, such that the multiple layers and the tag layer can be overlapped.

* * * * *